(12) United States Patent
Froehlich et al.

(10) Patent No.: US 7,768,709 B2
(45) Date of Patent: Aug. 3, 2010

(54) LONG TIME APERTURE OPTICAL TAPPED DELAY LINE

(75) Inventors: Fred F. Froehlich, Baltimore, MD (US); David B. Nichols, Columbia, MD (US)

(73) Assignee: Northrop Grumman Systems Corporation, Los Angeles, CA (US)

( * ) Notice: Subject to any disclaimer, the term of this patent is extended or adjusted under 35 U.S.C. 154(b) by 118 days.

(21) Appl. No.: 11/346,566

(22) Filed: Feb. 3, 2006

(65) Prior Publication Data

US 2007/0030567 A1    Feb. 8, 2007

Related U.S. Application Data

(60) Provisional application No. 60/649,087, filed on Feb. 3, 2005.

(51) Int. Cl.
G02B 27/30 (2006.01)
G02B 27/10 (2006.01)
H04J 14/00 (2006.01)

(52) U.S. Cl. ................ 359/641; 359/618; 398/53

(58) Field of Classification Search ........... 359/615, 359/626, 627, 629, 636, 641, 618; 398/53, 398/79, 82, 102; 385/31, 32, 47
See application file for complete search history.

(56) References Cited

U.S. PATENT DOCUMENTS

| | | | |
|---|---|---|---|
| 5,339,186 A * | 8/1994 | Weverka | 398/53 |
| 5,852,699 A | 12/1998 | Lissotschenko et al. | |
| 6,111,674 A | 8/2000 | Bhagavatula | |
| 6,266,176 B1 | 7/2001 | Anderson | |
| 6,388,815 B1 | 5/2002 | Collins | |
| 6,525,889 B1 | 2/2003 | Collins | |
| 6,608,721 B1 | 8/2003 | Turpin | |
| 6,674,939 B1 | 1/2004 | Anderson | |
| 6,724,951 B1 | 4/2004 | Anderson | |
| 6,760,140 B1 | 7/2004 | Argueta-Diaz | |
| 6,766,073 B1 | 7/2004 | Anderson | |
| 7,062,174 B2 | 6/2006 | Turpin | |
| 7,099,531 B2 * | 8/2006 | Chen et al. | 385/31 |
| 2002/0105705 A1 | 8/2002 | Turpin | |
| 2003/0128917 A1 | 7/2003 | Turpin | |
| 2004/0264695 A1 | 12/2004 | Turpin | |
| 2005/0114094 A1 | 5/2005 | Ivanovic | |

FOREIGN PATENT DOCUMENTS

WO    WO 01/93465    12/2001

OTHER PUBLICATIONS

International Search Report directed to PCT/US06/03760 mailed on Feb. 20, 2007; 1 page.
J. White (1942). "Long Optical Paths of Large Aperture," Journal of Optics Society of America, vol. 32, pp. 285-288.
B. L. Anderson et al. (2002). "Optical True Time Delay for Phased-Array Antennas: Demonstration of a Quadratic White Cell," Applied Optics; vol. 41, No. 23, pp. 4912-4921.

* cited by examiner

*Primary Examiner*—Alicia M Harrington
(74) *Attorney, Agent, or Firm*—Tarolli, Sundheim, Covell & Tummino LLP

(57) ABSTRACT

An optical tapped delay line device in accordance with the present invention is a method for and device for spatially resolving the spectral components of an optical signal, i.e., channelizing or spectrum analyzing the wavelength content of an optical signal. The device is based on a tapped optical delay line and enables numerous related optical signal processing functions.

40 Claims, 21 Drawing Sheets

Prism Coupler using TIR

45° Mirror

LONG TIME APERTURE OPTICAL TAPPED DELAY LINE

REFERENCE TO RELATED APPLICATIONS

This application claims priority to U.S. Provisional Application No. 60/649,087, filed Feb. 3, 2005, the contents of which are hereby incorporated by reference.

BACKGROUND OF THE INVENTION

1. Field of the Invention

The present invention relates to optical signal processing. More specifically, the present invention relates to a method and apparatus for enabling high-resolution optical spectrum analysis or channelization, and for enabling related signal processing operations.

2. Background of the Invention

The widespread use of optical communications and sensing has both fueled and benefited from new and better devices for placing signals on and detecting them from light (or optical carriers). The improved optical system performance, along with inherent advantages of optical signals (e.g., size, low loss, bandwidth, immunity to electrical interference, etc.), has led to a natural progression in need for and advantage of processing optical signals. The types of signals to be processed can be digital or analog; may include various types of information such as audio, video, image, data, radar, and other signals; and may exist at various data rates, bandwidths, protocols, or optical modulation types. Here, signal processing includes but is not limited to conventional filtering, multiplexing, coding, routing, analyzing, correlating, and synthesizing signals. With the gaining prevalence of signals in the optical form, new methods, techniques, and devices are needed to make these signal processing functions, which typically utilize electrical or other techniques, readily available for processing optical signals.

Typically, signal processing functions rely on some form of spectral (frequency-based) separation, combination, or both. Since optical systems are typically reversible, the discussions herein are mainly limited to the spectral separation (or spectral analysis) of a signal and treatment of spectral combination or recombination is obtained by reversing the direction of optical signal travel. The manner by which the information is spectrally separated (or analyzed or channelized) is critical to the basic performance parameters and the facilitating of processing functionality. The critical parameters of spectral analyzers are: high throughput efficiency (or low loss), low crosstalk (or clear separation between channels), free spectral range, narrow (or fine) frequency resolution, ratio of frequency range to frequency resolution (also known in the art as the time-bandwidth product), high linearity with frequency (analysis independent of frequency), large number of taps, large number of channels, size, manufacturability, and tight control on internal intermediate signals. Many of these parameters are closely related to each other. An important principal fuctionality of analyzers to be used for higher-level applications is the ease of access to spectrally or temporally resolved signals and ease by which the optical signals interact with other optics. The present invention substantially enhances the performance parameters and the ease of signal access from prior art.

There is a variety of optical devices in the prior art for performing spectrum analysis or channelization of optical signals. Spectrum analyzers typically separate or split the signal into spectral parts and make them available for processing, detection, or recombination. Whereas channelizers typically separate an input frequency band into specific channels, that is, they first analyze and then recombine signals into a plurality of output frequency bands. These devices achieve varying degrees of spectral resolution, crosstalk, and applicability to signal processing depending on their particular design. A selection of such devices is described below.

Fabry-Perot Interferometer

The Fabry-Perot interferometer is a known device for separating light into its component frequencies, or equivalently, its component wavelengths. FIG. 14 illustrates one example of a prior art Fabry-Perot interferometer. The illustrated device comprises two mirrors $M_1$ and $M_2$. Each of the two mirrors $M_1$ and $M_2$ is a partially reflecting mirror. The mirrors $M_1$ and $M_2$ are typically separated by an air space. Alternatively, the Fabry-Perot interferometer device could be made by coating both sides of a transparent plate with a partially reflecting material.

Light from a spectrally broadband source is input at plane $S_1$. Light rays at an angle $\theta$ and a wavelength $\lambda$ undergo multiple reflections between mirrors $M_1$ and $M_2$. The light rays interfere constructively along a circular locus $P_2$ in the output plane $S_2$. The condition for constructive interference that relates a particular angle $\theta$ and a particular wavelength $\lambda$ is given by $$2d \cos \theta = m\lambda,$$

where d is the separation of the partially reflecting surfaces, and m is an integer known as the order parameter. The Fabry-Perot interferometer thereby separates the component frequencies of the input light by using multiple beam reflection and interference. It is apparent from the equation above that the output light pattern of the system, i.e., the interference fringes, in the case of a diverging input beam, is a set of concentric circular rings. One ring is present for each combination of wavelength component of the input light and each integer m. For any given ring, the ring diameter increases as the light frequency is increased.

The Fabry-Perot interferometer is not well-suited for use in certain spectrum analysis or channelization applications due to the difficulty in obtaining high optical throughput efficiency. If the input beam is divergent, e.g., the direct output of an optical fiber, then the output pattern for a given wavelength is a set of rings. Multiple wavelengths produce nested sets of concentric rings. It is difficult to collect this light efficiently and concentrate it at multiple detector points, or couple it to multiple output fibers, especially while maintaining the separation of wavelength components that the interferometer has produced. If the input beam is collimated, e.g., the collimated output of an optical fiber, then the beam can be confined to a narrow range of angles to produce only a single-order output (e.g., m=+1) for each wavelength of interest. This collimation makes it easy to concentrate the output light at multiple detector points or fibers, but there is inherently high loss. The throughput efficiency can be no greater than 1/N, where N is the number of resolvable wavelength components at the optical system output aperture. That is, for a single wavelength input, only 1/N of the input power is resonant for maximum throughput. The other (N−1)/N fraction of the input is effectively reflected off the Fabry-Perot interferometer back towards the input. Fabry-Perot interferometers have highest throughput when the input beam is well collimated and only a single (or narrow band of) wavelength is being selected or separated. In addition, the fall-off (or "skirts") of the optical fringes formed by the Fabry-Perot interferometer is relatively large, which limits the crosstalk and channel separation of the device.

OTDL Channelizer

FIG. 15 shows an example of a prior art planar waveguide integrated optical multiplexer and demultiplexer device, as disclosed by Bhagavatula in U.S. Pat. No. 6,111,674. In this device, a multiple-wavelength input signal is demultiplexed or channelized using a Fabry-Perot thin film stack consisting of alternating partially reflective and transmissive layers. The angularly dispersed wavelengths emerge from the "optical path length difference generator" and are individually coupled to a fan-shaped output array of waveguides by means of a focusing lens. This device could be fabricated as either a planar or a hybrid integrated optical (IO) structure. The drawback to this type of integrated optical demultiplexer/multiplexer is the inherently high loss associated with the thin film wavelength-separation elements, which limits the number of channels that can be effectively channelized. In addition, the spectral resolution is limited by the relatively short optical path length that can be achieved in a planar or hybrid IO structure.

Optical Fiber-Based OTDL Spectrum Analyzer

Ranalli in WO 01/93465 A1 and FIG. 2 therein teaches an optical fiber-based optical tapped delay line spectrum analyzer as replicated here as FIG. 16. The output fiber lines 76 are cut such that adjacent fibers differ in length by about 1 centimeter (cm), which corresponds to a relative delay, T, of about 50 picoseconds (psec) between two optical signals in two adjacent output fiber lines. This delay between adjacent outputs determines the sampling interval for the diffractive array 68. The inverse of the sampling interval (i.e., 1/T) establishes the free spectral range provided by the array 68. In this embodiment, the free spectral range is about 20 GHz. To satisfy the Nyquist sampling theorem and to avoid aliasing, the optical bandwidth of the signal should be less than half the free spectral range; thus, the bandwidth of the optical signal should be less than about 10 GHz. The spectral resolution provided by the array equals the free spectral range divided by the number of taps or output fiber lines 76 into which the optical signal is efficiently coupled. Since the diffractive array 76 produces eight time-delayed outputs, the spectral resolution obtained is about 2.5 GHz. This resolution is much less than the resolution obtained by preferred embodiments of the present invention. Additionally, fabrication and stability of this device may be difficult as environmentally-independent, very precise fiber lengths are needed for proper operation.

BRIEF SUMMARY OF THE INVENTION

The present invention, in its preferred embodiments, provides a method and device for spatially separating or resolving the spectral components, i.e., the frequency or wavelength components, of an input optical signal. Spectrum analysis of the input optical signal is thus achieved and the spatially separated spectrum is produced at a plane in space where it may be detected, measured, or processed further. Additionally, the spectrum is produced with very fine frequency resolution by virtue of the particular optical tapped delay line architecture. The optical tapped delay line architecture may be used to implement other optical signal processing functions such as filtering, combination, synthesis, and correlation, in addition to spectrum analysis.

BRIEF DESCRIPTION OF THE DRAWINGS

A detailed description of some preferred embodiments of the present invention will be made with reference to the accompanying drawings.

FIGS. 12 and 13 illustrate examples of a general purpose 2-D arrangement that could be used for various applications, including but not limited to spectrum analysis, channelization, and dispersion compensation in a fiber-optic telecommunications system.

FIG. 17 illustrates an example of actual experiment.

DETAILED DESCRIPTION OF THE INVENTION

Preferred Embodiments

The following detailed description is of the best presently contemplated mode of realizing an optical tapped delay line (OTDL) in accordance with the present invention. This description is not to be taken in a limiting sense, but is made merely for the purpose of illustrating the general principles of the invention. The scope of the invention is best defined by the appended claims.

Figure 5:
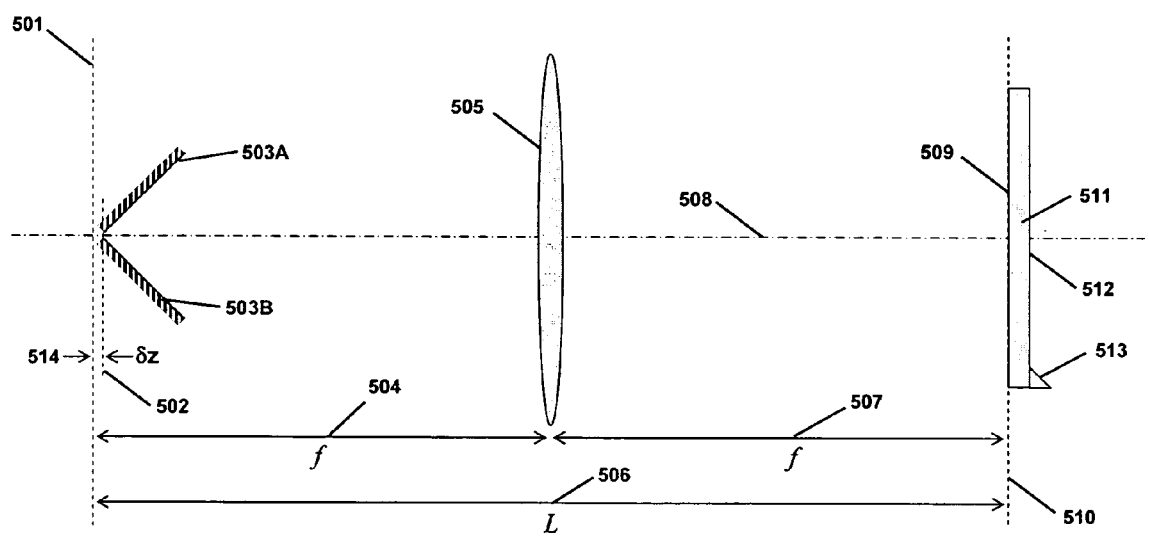
FIG. 5 illustrates an example of an optical tapped delay line (OTDL) in accordance with the present invention.
Figure 18:
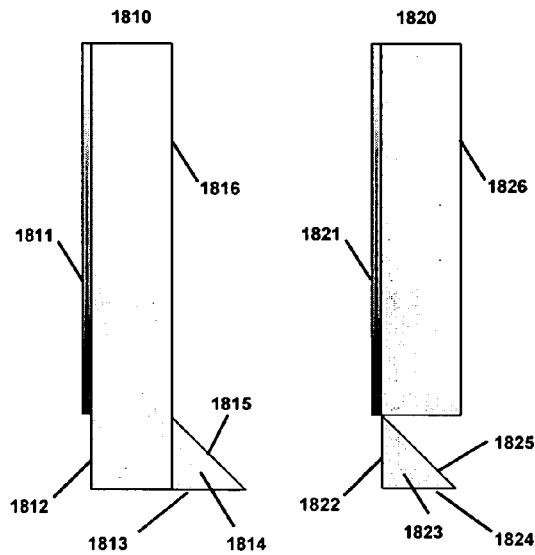
FIG. 18 illustrates examples of four possible embodiments for a prism input coupler for introducing the input beam into the OTDL cell.
Figure 18:
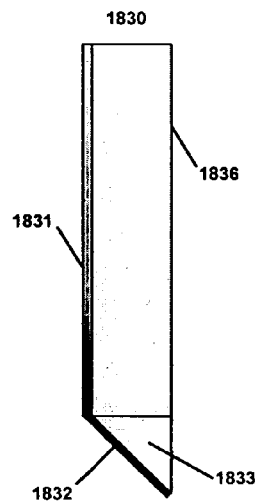

FIG. 5 illustrates an example of a preferred embodiment of an OTDL device in accordance with the present invention. The FIG. illustrates an optical cell or cavity (500) formed by a dihedral mirror pair at one end (503A and 503B), a lens (505), an output coupler mirror at the opposing end (511), and an input coupler element (513), which in this case is a prism. The distance from the vertex of the dihedral mirror pair to the lens is nominally equal to the lens focal length f (504), and the distance from the lens to the output coupler mirror also is nominally equal to f (507) The total cell length L (506) is thus nominally equal to 2f. The dihedral mirrors are coated with a highly reflective coating, and the angle between them differs from 90 degrees by a small amount δθ. The vertex of the dihedral mirror pair (plane position located at 502) is offset from the back focal plane (BFP, 501) of the lens by a small distance δz. The output coupler mirror has a first surface (509), referred to herein as the cavity-facing surface (CFS), which is preferably coated with a gradient reflectivity coating, i.e., the reflectance is highest at the end nearest the prism (typically nearly 100%), and gradually tapers to a lower value toward the opposite end. The gradient reflectivity is illustrated in FIG. 18 as 1811, 1821, or 1831. Alternatively, the CFS may be coated with a coating of uniform reflectance. The output coupler mirror has a second surface, referred to as the egress-facing surface (EFS), which is preferably coated with an antireflection coating (512). The CFS preferably faces inward toward the cell and is coincident with the front focal plane (FFP, 510) of the lens. For thin output coupler mirrors (e.g., pellicle beamsplitters), the CFS and EFS may be opposing surfaces of the same material.

Figure 6:
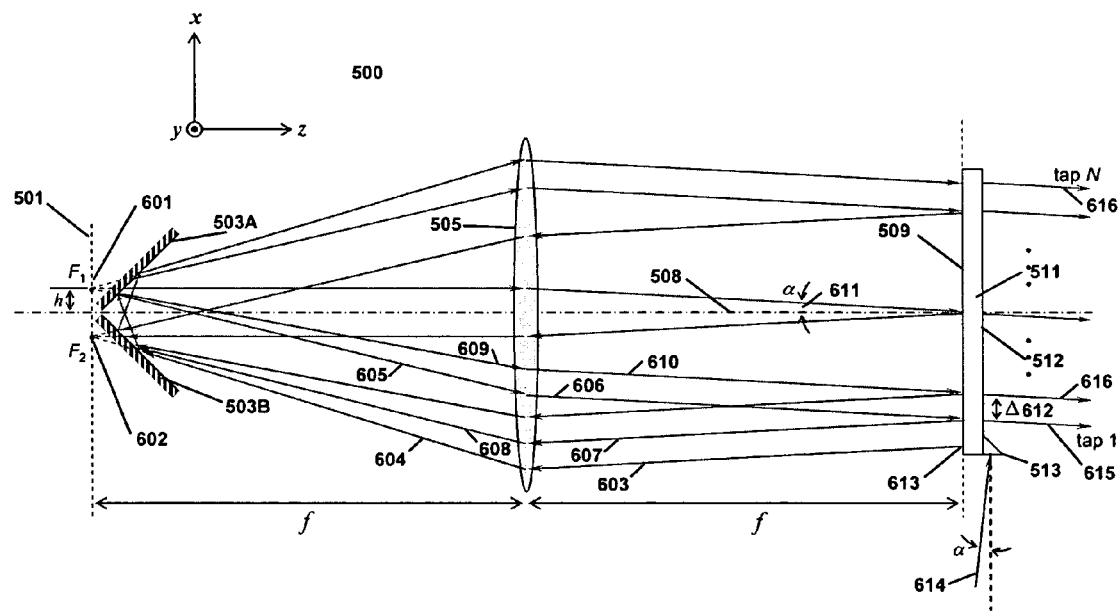
FIG. 6 illustrates an example of one possible path for a chief ray of a light beam through an OTDL cell in accordance with the present invention. Dihedral reflector makes F1 and F2 coincident on axis.

FIG. 6 illustrates an example of one possible path for the chief ray of the light beam through the OTDL cell (500). The beam undergoes multiple round trips through the cell. A sample of the beam energy is tapped upon each reflection from the output coupler mirror to produce an output beamlet or tap. In this example the first tap (615) is located near the input coupler (513) and the last tap (616) is located on the opposite side of the output coupler mirror (511). The collection of output beamlets that are spatially distributed across the aperture of the output coupler mirror represents samples of the input beam at various time delays. The spatial separation between adjacent taps may be represented by Δ (612). The temporal separation (time delay) between adjacent taps or samples is equal to the round trip transit time of the cell, represented by τ. The round trip transit time is the time for the light to travel from the output coupler mirror CFS (509) to the crossing of the optical axis (508) and back to the output coupler mirror CFS (509). Essentially, the dihedral mirrors (503A and 503B) create virtual images of that crossing point at points $F_1$ (601) and $F_2$ (602), which both lie on the BFP (501). As is known in the art, the time delay τ/2 from the BFP to the FFP of a lens is constant across the focal plane apertures. Therefore, an optical tapped delay line is realized by this arrangement. The collection of output beamlets may then be optically processed further to perform spectrum analysis or other signal processing functions, as will be described below.

In the embodiment shown in FIG. 6, the input beam (614) is introduced to the OTDL cell (500) through a prism (513). The input beam is inclined at a small angle α to the x-axis. The beam reflects internally from the hypotenuse face of the prism either via total internal reflection or by means of a reflective coating applied to the hypotenuse. The input beam comprises at least one frequency component to be analyzed. The input beam may typically have a Gaussian spatial profile, although this is not a requirement. If the beam is Gaussian, it may be preferable to arrange for the beam to form its narrowest point, or waist, with radius $w_o$ (at point 613) at the CFS of the output coupler mirror (509), but this is not a requirement. The creation of this waist could be accomplished with input optics (not shown) prior to the prism. The beam leaves the output coupler mirror along ray path 603 inclined at a small angle α to the z-axis to execute the first round trip of the cell. The lens refracts the beam along ray path 604 toward the focal point $F_2$ (602), which lies in the BFP of the lens and is displaced from the central optical axis by a distance h. Prior to reaching $F_2$, the beam is reflected by the lower dihedral mirror (503B), and then is reflected by the upper dihedral mirror. The beam leaves the upper dihedral mirror (503A) along ray path 605 as though it were emanating from focal point $F_1$ (601). Furthermore, the beam is not exactly retroreflected (not exactly at the same angle with respect to the optical axis 508) by the dihedral mirror pair on account of the angular adjustment $\delta\theta$, i.e., ray paths 604 and 605 are not exactly parallel. In this case, the angle between the mirrors is greater than 90 degrees by the small amount $\delta\theta$, and thus the inclination of ray path 605 is less than that of ray path 604 by the amount $2\delta\theta$. The lens refracts the beam along ray path 606 toward the output coupler mirror and again is inclined at a small angle $\alpha$ to the z-axis. The beam is incident on the output coupler mirror at the tap 1 (615) position, thus completing the first round trip of the cell. The tap 1 position is displaced from the input beam position by the distance $\Delta$ (612), which is the tap-to-tap separation. A small fraction of the incident light is transmitted through the output coupler mirror by the gradient reflectivity coating to form the first output beamlet or tap 1 (615). The majority of the incident light is reflected back into the cell along ray path 607 to begin the second round trip of the cell. This reflected beam traverses the cell in a manner similar to that described above, but now along ray paths 607, 608 and 609, and returns to the output coupler mirror along ray path 610 where it is incident at the tap 2 position. The tap 2 position is displaced from the tap 1 position by the distance $\Delta$, and another small fraction of the incident light is transmitted through the output coupler mirror by the gradient reflectivity coating to form the second output beamlet or tap 2 (616). Adjustments $\delta\theta$ and $\delta z$ cause the beam to walk across output coupler mirror by $\Delta$ each round trip. The beam also walks across dihedral facets on each round trip although F1 and F2 remain stationary. This process is repeated until a series of N output beamlets or taps is produced across the aperture of the output coupler mirror. For simplicity, not all ray paths for all N round trips of the cell are shown in the FIG. The number of taps N is typically on the order of tens to several hundred.

The gradient reflectivity coating on the output coupler mirror CFS preferably is designed to achieve two goals. First, the coating is designed such that nearly all of the input beam power is distributed over the N beamlets with minimal input beam power directed toward an N+1 beamlet that is vignetted by the imaging lens or the output coupler mirror, and thus the power is coupled efficiently out of the cell. This feature provides for high optical throughput to the components that follow the OTDL. Second, the coating is designed to achieve a particular power weighting of the beamlets that are output from the OTDL. For example, the beamlets could be weighted to all have equal power, or they could be weighted to follow a truncated Gaussian profile as a function of position across the output coupler mirror. The particular weighting chosen is application dependent, but the weighting typically is chosen to optimize the resulting optical spectral response (spot size and shape) at a back focal plane of a subsequent Fourier transform lens, not shown in FIG. 6. The spot size and shape relate directly to performance parameters such as spectral resolution (spot width) and crosstalk (spot shape, including nearby power in so-called "sidelobes"). The optimal response is the result of trading off these and other performance parameters given in the Background of the Invention.

One interpretation of the operation of the OTDL is based on recognizing that the OTDL acts like a folded optical imaging system. Each round trip of the cell represents an optical imaging operation. The profile of the beam leaving the output coupler mirror from the input beam position, or from any subsequent tap position, is the object of the imaging system. The object is imaged through the system and back to the output coupler mirror where the image of the beam profile is produced. The lens and the dihedral mirror pair essentially form a 4-f afocal relay imaging system folded back on itself at its midpoint, except a conventional 4-f afocal relay would have a planar mirror instead of a dihedral type mirror. In the case of the OTDL, the dihedral mirror pair serves to change the chief ray angle so that the image of the beam profile is displaced from the object by the distance $\Delta$. Due to the 4-fafocal relay configuration, the traverse magnification is unity, and thus the image is the same size as the object. That is, the profile of the beam leaving the output coupler mirror is reproduced over and over with the same size at each output beamlet position. For example, if the input beam has a Gaussian profile with a waist at the CFS of the output coupler mirror, then the waist is reproduced at each output beamlet position at the CFS of the output coupler mirror. In addition, all the output beamlets are parallel and are propagating at a small angle $\alpha$ to the z-axis.

Figure 7:
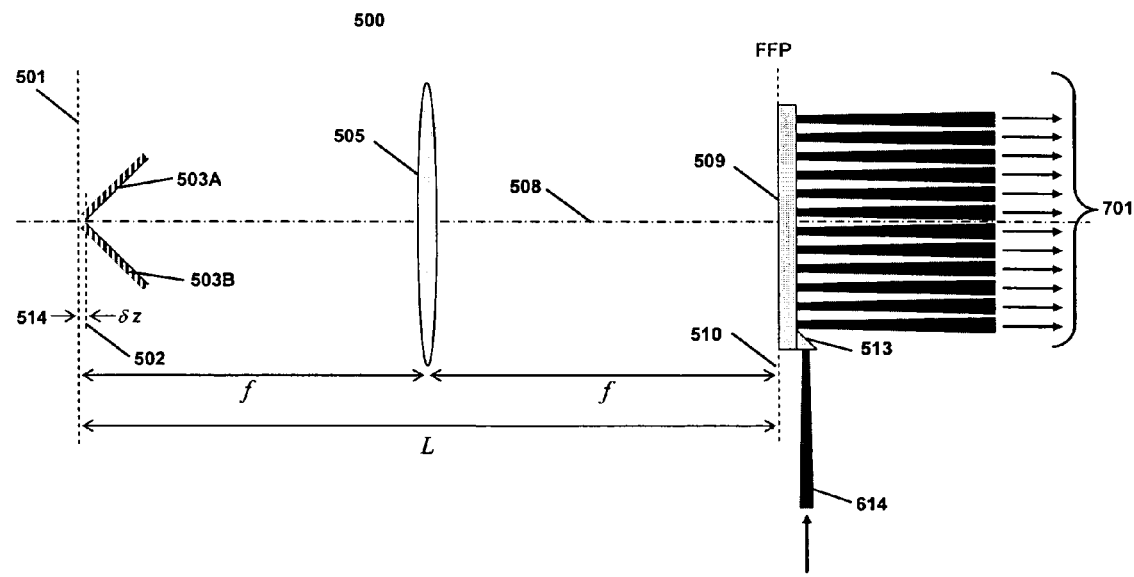
FIG. 7 illustrates an example of a resultant output of an OTDL cell showing a matched set of output Gaussian beamlets that are replications of the input beam in accordance with the present invention.

FIG. 7 illustrates an example of the resultant output of the OTDL cell without the details of the chief ray trace. The OTDL produces a matched set of output Gaussian beamlets (701) that are replications of the input beam. The output beamlets are parallel, they have a common waist size $w_o$ and all the waists are in a common plane, they are spaced by the distance $\Delta$ in the plane, and they are delayed in time with respect to each other by $\tau$. These features are advantageous for performing optical spectrum analysis or other optical signal processing functions, as will be described below.

Figure 8:
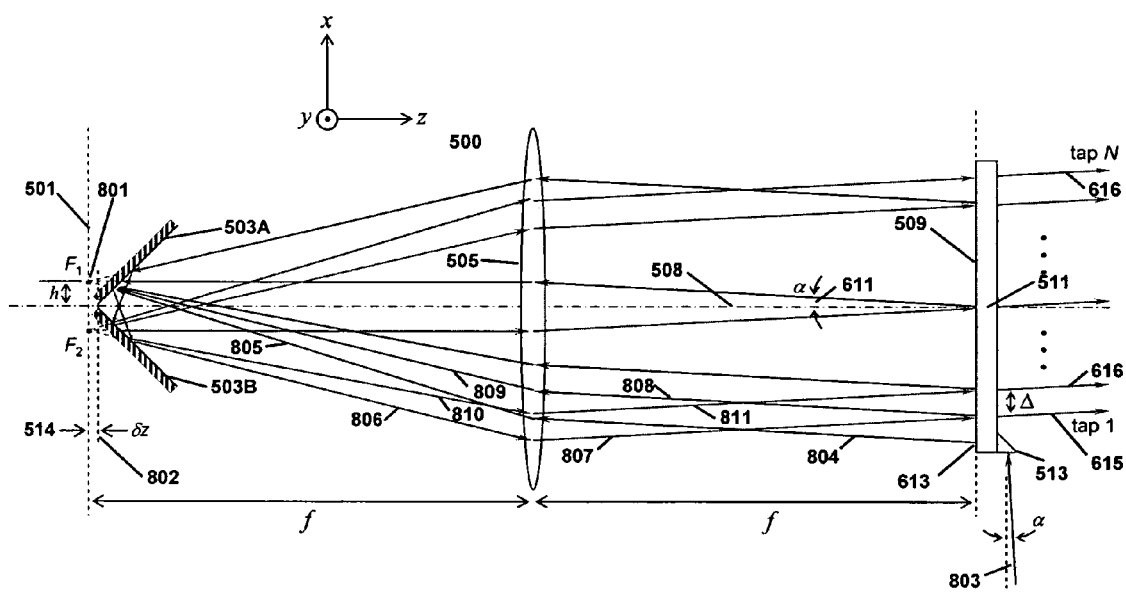
FIG. 8 illustrates an example of an alternate possible path for a chief ray of a light beam through an OTDL cell in accordance with the present invention.

FIG. 8 illustrates an example of an alternate possible path for the chief ray of the light beam through the OTDL cell. In this configuration the input beam (803) is inclined in the opposite sense to the x-axis as compared to FIG. 6, which has the advantage of enabling the beamlet spacing $\Delta$ to be minimized. The change in inclination of the input beam causes a corresponding change in the inclination of the beams leaving and returning to the output coupler mirror. Beams leaving the output coupler mirror now are refracted by the lens toward the focal point $F_1$ (801) and are incident first on the upper dihedral mirror (503A). After reflection from the lower dihedral mirror (503B) the beams appear to be emanating from focal point $F_2$. In this case, the angle between the mirrors is less than 90 degrees by the small amount $\delta\theta$. The labeling of the ray paths 804 through 811 has the same interpretation as given above in reference to FIG. 6 ray paths 603 through 610. The N output beamlets now are inclined in the opposite sense to the z-axis as compared to FIG. 6.

The present invention, in its preferred embodiments, enables spectrum analysis or channelization of an optical signal. It enables a relatively high, relatively fine spectral resolution of the frequency content or wavelength content of the signal.

Comparison to Known Art

Both the present invention and the hyperfine device described in U.S. Pat. No. 6,608,721 (hereinafter also referred to as "the known hyperfine device") enable spectrum analysis or channelization of optical signals. Both devices may be especially useful as a multiplexer or a demultiplexer device for fiber-optic telecommunications systems. They may be used in a wavelength division multiplexing (WDM) system to combine or separate multiple wavelength channels, where each wavelength channel contains some signal information or data information. Both devices may achieve higher spectral resolution than other existing technologies such as interference thin film coatings, classical diffraction gratings, or arrayed waveguide gratings, etc. as are described in U.S. Pat. No. 6,608,721 (the disclosure of which is incorporated herein by reference). The following related pending patent applications owned by Applicant are also incorporated herein by reference: U.S. application Ser. No. 60/208,894; U.S. application Ser. No. 10/199,495; U.S. application Ser. No. 10/051,334; U.S. application Ser. No. 60/263,306; U.S. application Ser. No. 10/051,229; U.S. application Ser. No. 60/263, 307; U.S. application Ser. No. 10/715,824; U.S. application Ser. No. 60/427,249; U.S. application Ser. No. 60/707,545.

The present invention enables a higher or finer spectral resolution to be achieved than can be obtained with a known hyperfine device. The present invention may be used for WDM purposes, for combining or separating multiple wavelength channels in a telecommunications system. It may be especially useful for performing fine spectrum analysis. For example, the present invention enables very fine spectral analysis of a single wavelength channel in an optical communication system that has modulation information on the optical carrier. The present invention may be viewed as an extension of the known hyperfine device for applications that require very high spectral resolution.

Figure 1:
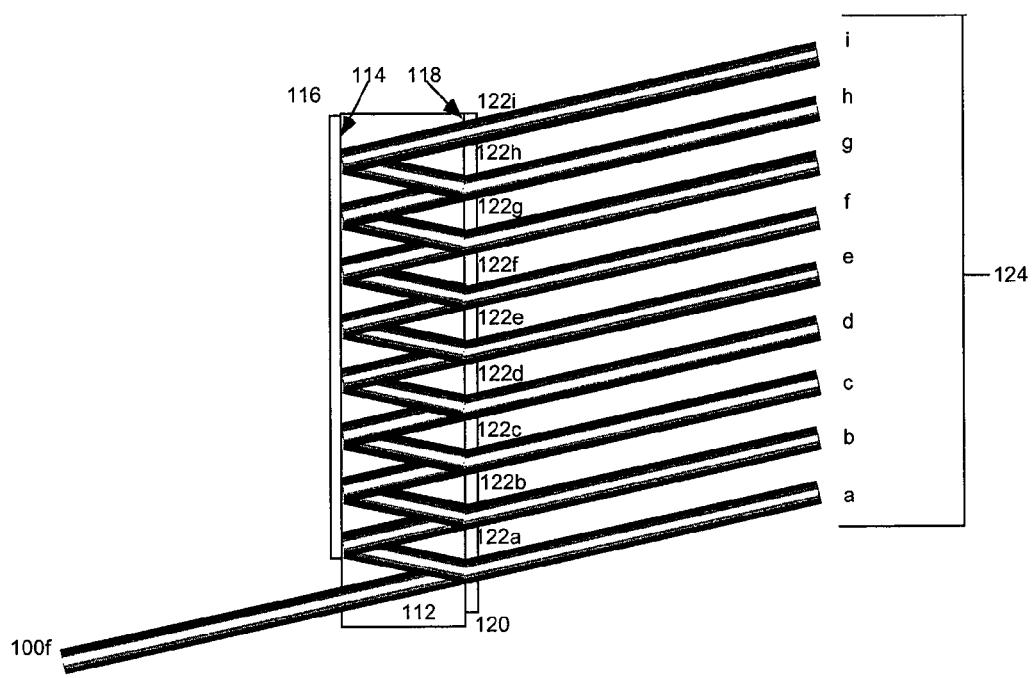
FIG. 1 illustrates an example of an operational side view of a prior art OTDL device.
Figure 2:
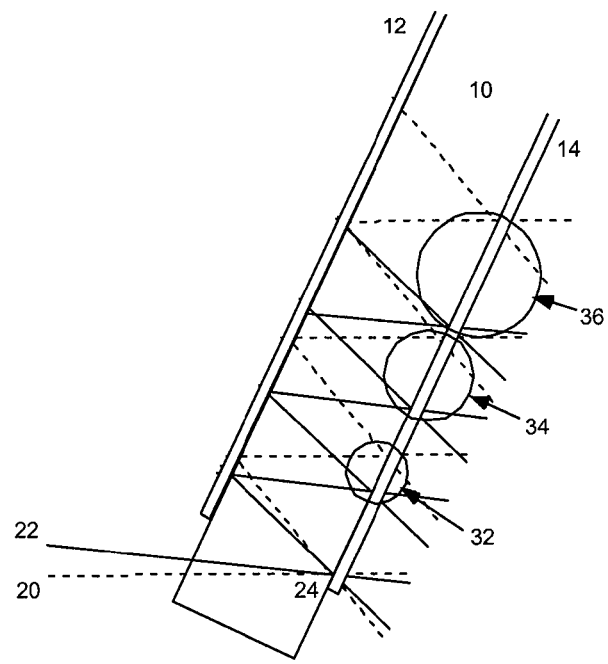
FIG. 2 illustrates an example of the spreading of the optical beams within a prior art VIPA device and the difficulty in weighting the individual beams to shape the output channel filter.
Figure 3:
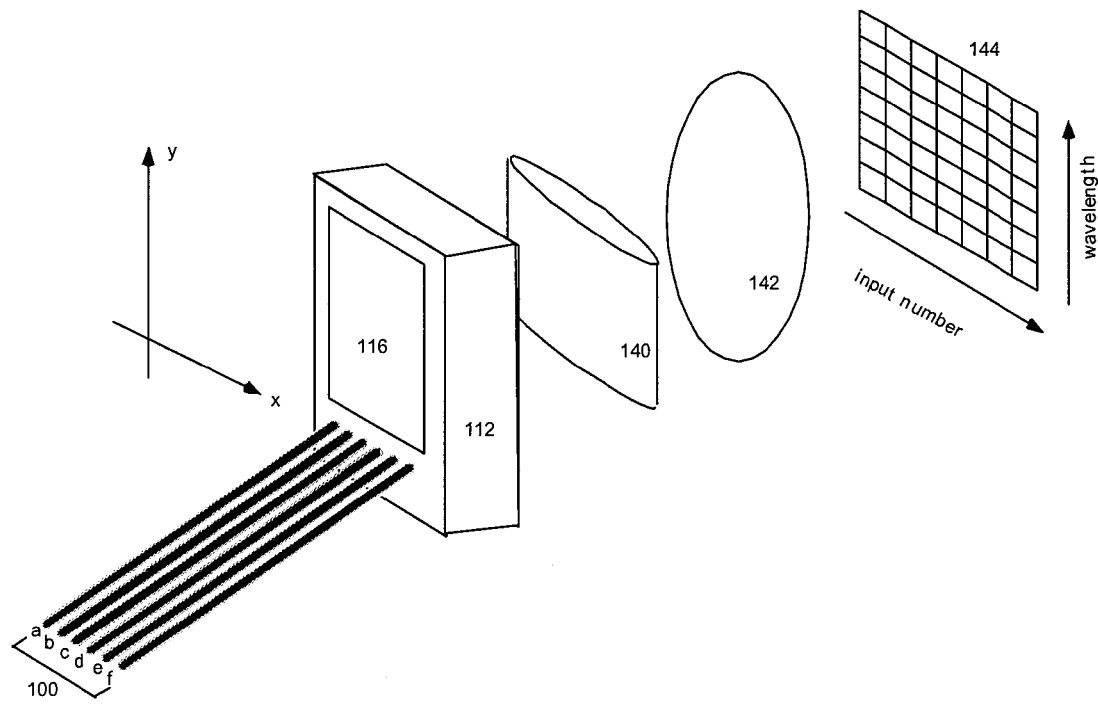
FIG. 3 illustrates an example of a prior art Optical Tapped Delay Line (OTDL).

FIG. 1 illustrates an example of a collimated input beam entering a known hyperfine device and executing a zigzag pattern through the device. The beam illustrated in FIG. 1 is somewhat idealized. As illustrated, the input beam 100f appears collimated and remains perfectly collimated throughout all the taps 124a-i. None of the beams are shown to diverge. This is an idealization, because all actual optical beams diverge or diffract and spread as they propagate over distance. The diffraction or spreading effect can be limited or controlled in some cases. For example, that would be the case for a known hyperfine device that is designed for a free spectral range (FSR) or bandwidth on the order of 100 Gigahertz and a number of taps that is on the order of 10 to 100 taps. In those cases the collimated beam idealization is applicable because the total path length of the beam in the device is short enough that there is minimal divergence or spreading of the beam as it undergoes this zigzag path. However, if finer and finer spectral resolution is desired, the total path length in the device needs to increase proportionately. This increase in path length can be achieved in one of two ways. First, the cavity length can be increased such that each round trip is longer. Second, the number of taps (or round trips or bounces) can be increased. If either of these options is attempted with a known hyperfine device, which has plane parallel mirrored surfaces on either side of the cavity, the natural beam divergence may become a problem at some point. The beam begins to diverge and a situation similar to that shown in FIG. 2 is encountered. This FIG. is actually a depiction of the VIPA device, but the same type of effect is encountered. The beam begins to expand and diverge, and at each tap the beam is getting larger and larger. There are three consequences of this beam expansion. One consequence is that as the beam expands the device must be made physically larger in the lateral dimensions to contain the beam to prevent it from being cut off or vignetted. The second consequence is that as the output beamlets enlarge, the variation of the reflectivity of the cavity output surface across a single beamlet can no longer be ignored. The third consequence is that as the beamlets enlarge, they begin to overlap and the reflectivity at any given point on the cavity output surface acts on two or more beamlets and so power weighting control of the beamlets is no longer independent. That is, if the beam expands to the point where the output beamlets are overlapping or largely overlapping, then the weighting of individual beamlets can no longer be precisely controlled with the gradient reflectivity coating because each beamlet is covering (or sampling) its own reflectivity at its beam center and that of its neighbors. The present invention provides a way to overcome or obviate this beam expansion problem in applications in which one is attempting to achieve high spectral resolution and a long total path length is required through the device.

In its preferred embodiments, the present invention overcomes the beam expansion problem by, instead of propagating the beam freely through a uniform medium as it does with the known hyperfine device, the beam is re-imaged on each round trip through the present invention by an imaging lens as shown, for example, in FIG. 5. FIG. 7 is intended to show an example of the desired result. The input beam typically has a Gaussian spatial profile, as is the case for the known hyperfine device. However, the input beam does not diverge continuously in the present invention, but is now re-imaged on each round trip through the cavity such that at the output coupler mirror the input beam is reproduced N times. Therefore, a set of N output Gaussian beamlets is produced that are all the same size. For example, if the input beam has a small diameter, then that small diameter beam is reproduced N times to create the N taps, or N output beamlets. Thus, the total aperture in the lateral dimension required at the output coupler mirror is much smaller than would be required with the known hyperfine device and the output beamlets at the CFS are largely non-overlapping.

As a result of overcoming the beam expansion problem, the cavity length L can be made quite long, on the order of centimeters to several meters, for example, which is much longer than could be achieved with a known hyperfine device without encountering the aforementioned issues related to beam expansion. The cavity length of a known hyperfine device is limited to a length on the order of millimeters—approximately 1 to 10 millimeters, typically. The relatively longer cavity length of the present invention enables a very long total path length or total time delay in the cavity. The total time delay is the product of the roundtrip transit time of the beam, $\tau$, and the number of beamlets generated, N. At the same time, since the time delay from tap to tap in the present invention is relatively long, the free spectral range (FSR) or unambiguous bandwidth of the device is proportionately smaller than that of the known hyperfine device.

There are two key parameters of the OTDL to consider: (1) the free spectral range (FSR), which is the unambiguous bandwidth that the device can process, and (2) the spectral resolution, $\rho$, of the device. The spectral resolution is roughly equal to the FSR divided by the number of taps N, i.e., $\rho \cong FSR/N$. Equivalently, the spectral resolution is roughly equal to the reciprocal of the total delay time of the device, i.e., $\rho \cong 1/N\tau$. For the known hyperfine device constructed with two planar reflective surfaces, the optimal application space is for FSRs of approximately 100 Gigahertz on the high frequency side (limited by large angles of the input beam to prevent beam overlap), and around 10 Gigahertz on the lower frequency side (limited by beam expansion degradations). It may become difficult to fabricate a known hyperfine device with an FSR much lower than about 10 Gigahertz. In addition to beam expansion issues, the planar reflective surfaces become large and may be difficult to fabricate with the required surface flatness. Interestingly, the upper limit on FSR for an OTDL device in accordance with the present invention is on the order of 5 to 10 Gigahertz (as limited by the thickness of the Imaging lens or spherical mirror curvature, as presented in FIG. 27 and discussed below). Generally, the lower the FSR, the easier it is to fabricate an OTDL device in accordance with the present invention. Thus, taken together, the known hyperfine device and the OTDL device in accordance with the present invention span a wide range of application bandwidths. Both device types typically have roughly the same number of taps N, that is, the same number of resolution elements or resolution spots. Therefore, the known hyperfine device addresses applications requiring wider bandwidths and moderate spectral resolution, whereas the OTDL device in accordance with the present invention addresses applications requiring narrower bandwidths and very high spectral resolution.

Applications and Uses

U.S. patent application Ser. No. 10/199,495 (PCT/US02/23109) entitled "Method and Apparatus for Optical Signal Processing using an Optical Tapped Delay Line," filed Jul. 21, 2002 teaches embodiments of optical signal processing that utilize the hyperfine optical tapped delay line device disclosed in U.S. Pat. No. 6,608,721. U.S. application Ser. No. 10/199,495 is included here by reference and its embodiments are referred to herein as "the known OTDL-based OSP applications." In particular, the OTDL of the present invention may replace the known hyperfine device in all of the embodiments of the known OTDL-based OSP applications.

Figure 19:
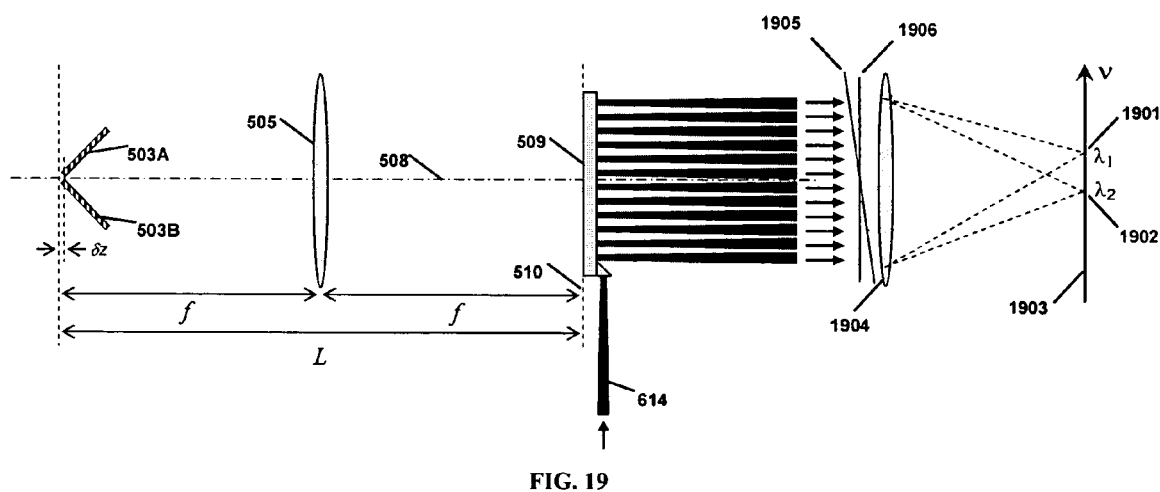
FIG. 19 illustrates an example of the present invention as a basic spectrum analyzer or channelizer processor.

FIGS. 5, 6, 7 and 8 illustrate examples of an OTDL cavity in accordance with the present invention. The optical system comprising an OTDL cavity generates N output beamlets that are equally spaced by the spatial separation $\Delta$ and are temporally delayed with respect to each other by the time delay $\tau$. In order to perform a signal processing function, e.g., spectrum analysis, further processing on the N output beamlets using additional components is typically required. FIG. 19 illustrates an example of a basic arrangement for performing spectrum analysis or channelization of optical signals. The plurality of output beamlets from the OTDL cavity can be seen as creating wavefronts in particular directions, each wavefront direction is determined by the wavelengths of light present in the input optical signal. The wavefronts (or constituent beamlets) are directed to a Fourier transform lens (1904) or a Fourier transform optical system, which performs a Fourier transform operation on the N output beamlets or output taps. The Fourier optical system might be a simple spherical lens, or a combination of lenses, or it might be a more complex anamorphic system. The Fourier transform operation results in the creation of an optical frequency spectrum at the focal plane (1903) of the Fourier lens, with the angle of the wavefront entering 1904 being converted to position on the focal plane. That is, the constituent wavelength components of the input beam are spatially separated and spatially resolved at the focal plane, which is also referred to as the frequency plane. In the example shown, there are two wavelength components of the input optical beam. The dotted lines from the Fourier transform lens to the focal plane show roughly how the output Gaussian beamlets from the OTDL are focused to a spot at the focal plane. Light of wavelength $\lambda_1$ creates wavefronts 1905 and is brought to a focus by the Fourier lens at one spot (1901), and light of wavelength $\lambda_2$ creates wavefront 1906 and is brought to focus at a spatially separated spot (1902). Thus, the OTDL together with the Fourier transform optics spatially disperse the spectrum of the input light and each frequency component is distributed along the frequency axis marked "v."

Figure 4:
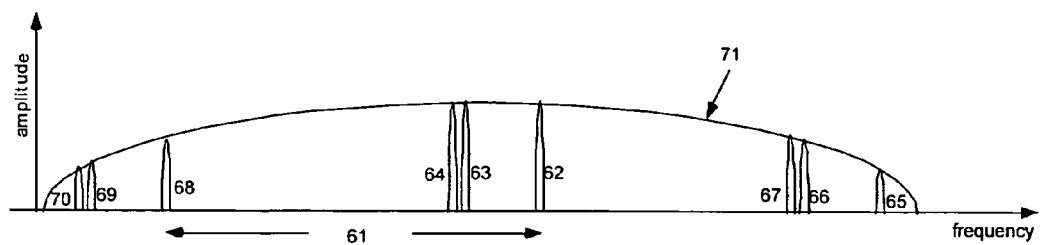
FIG. 4 illustrates an example of the optical output distribution along the frequency direction corresponding to a single input beam for a prior art OTDL.

The appearance of an example optical spectrum at the frequency plane is shown in FIG. 4, which is taken from U.S. Pat. No. 6,608,721. In this case, there are three distinct wavelength components or frequency components in the input beam and each wavelength component produces a separate focused spot at the focal plane, as shown by spots 62, 63 and 64. In addition, other spots (or other orders) may be present as well with the present invention, that is, each wavelength component generally produces multiple wavefronts and thus multiple spots at the focal plane. These spots may be referred to as multiple interference orders of the device. That is, referring again to the example shown in FIG. 4, a single frequency input would result in spots 62, 68 and 65. Another slightly different frequency would result in spots 63, 69 and 66, and so on. One or more orders may be used and typically depend on the application. In addition, the optical power of the spots in the various orders is weighted by a spectral envelope function, an example of which is illustrated by curve 71. The spectral envelope may be tailored to control the relative weighting of the multiple orders to some degree by controlling the spatial profile of the input beam applied to the OTDL cavity. Typically, the orders near the center of the frequency plane, i.e., near the axis of the Fourier lens, have the highest weighting, and the power tapers off to either side.

Various devices can be placed at the frequency plane, for example, a detector array could be used to detect the optical spectrum. Some of these options are detailed in U.S. Pat. No. 6,608,721, beginning at column 7, line 20, and these options apply to the present invention as well. For example, a detector array, a lenslet array, a light pipe array, a fiber optic bundle, an array of GRIN lenses, or any combination of the above, may be positioned at the frequency plane. The purpose may be to detect and measure the spectrum at the focal plane or, for example, a fiber optic bundle might be used to couple the different light spots (different wavelengths) into different fibers to subsequently detect, channelize, process, or transport to other locations.

Figure 9:
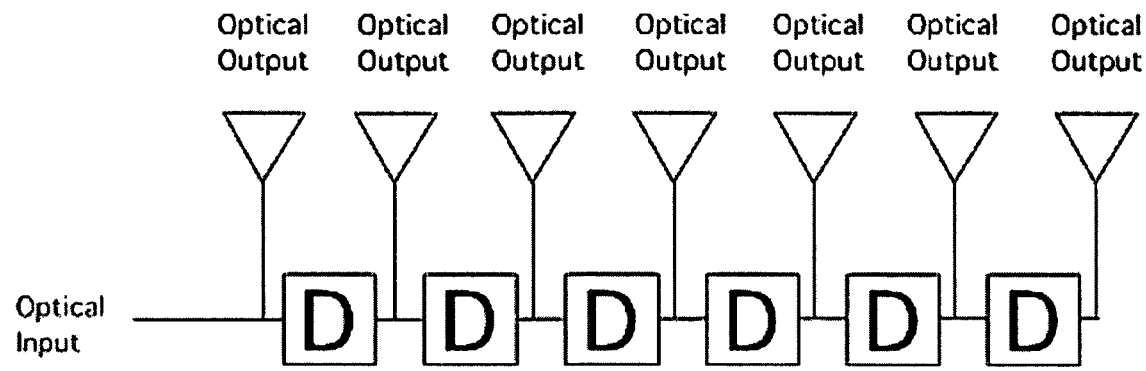
FIG. 9 illustrates an example of a schematic block diagram of the functional operation of a prior art device in a single-input arrangement.

FIG. 9 shows an example of a functional block diagram that helps describe the operation of the present invention. The FIG. is taken from U.S. Pat. No. 6,608,721 and is applicable to the present invention as well. The optical input beam arrives at the left in the FIG. and from that beam a series of optical outputs or optical taps is derived that represents samples of the input beam. Each of delay elements D imposes a small additional delay $\tau$ upon the optical beam. Thus, the end result is a set of N taps or N samples of the input beam all delayed in time with respect to each other, hence, an optical tapped delay line is realized. Details of how the OTDL device achieves spectrum analysis or channelization are described in U.S. Pat. No. 6,608,721, and that description is applicable to the present invention as well. The description is found in column 7, line 25 through line 65, of U.S. Pat. No. 6,608,721. The description relates to FIG. 10 and FIG. 11 of U.S Pat. No. 6,608,721 (which corresponds to FIG. 9 and FIG. 11, respectively, herein). The description provides details about the relative phase shifts of the light from output tap to output tap, and the wavelength dependence of those phase shifts that enables spectrum analysis.

Figure 10:
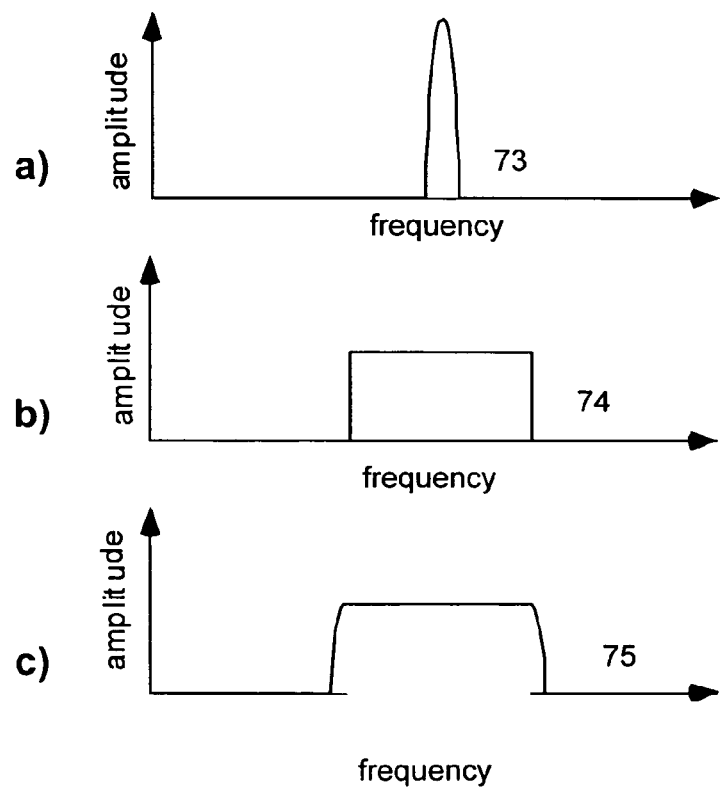
FIG. 10 illustrates an example of the optical frequency response of a channel of a prior art OTDL device.
Figure 11:
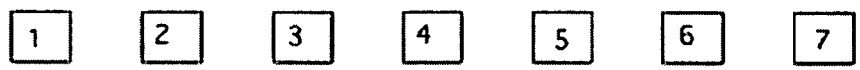
FIG. 11 illustrates an example of a schematic block diagram of the functional operation of a prior art device in a single-input arrangement, including an optical system and output elements at an output surface.
Figure 11:
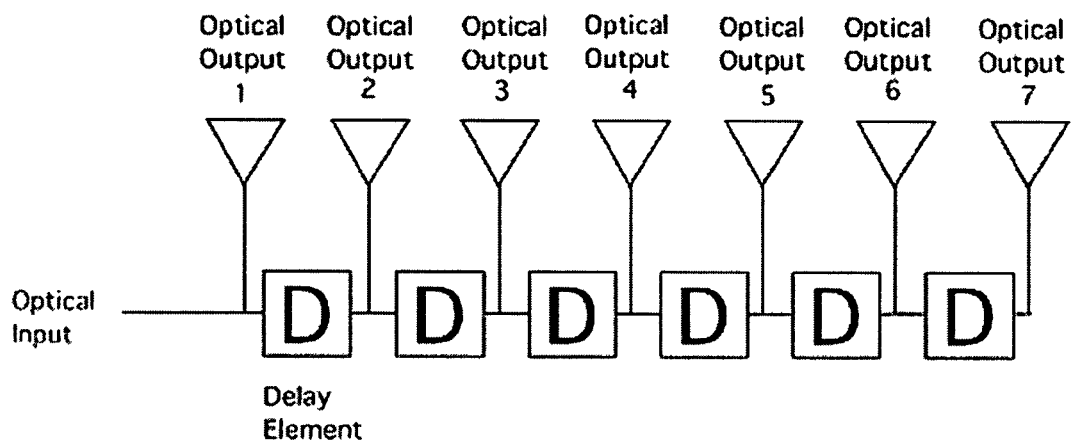

FIG. 9 of U.S. Pat. No. 6,608,721 (which corresponds to FIG. 10 herein) also is applicable to the present invention in describing the mechanism that creates a channel filter shape or channel response. The description is found in column 11, line 40 through line 50, of U.S. Pat. No. 6,608,721. Referring to FIG. 10 herein, FIG. 10(a) illustrates an example of the profile of an optical spot 73 at the frequency plane corresponding to a single wavelength input. FIG. 10(b) illustrates an example of the spatial response 74 of a detector element, or an optical fiber, or a lenslet, etc. positioned at the frequency plane that defines a given channel. Typically, there is an array of such detector elements, or optical fibers, or lenslets that span the optical spectrum at the frequency plane and define a series of channels. A channel filter shape or channel response 75 is given mathematically by the convolution of 73 and 74, and an example is illustrated in FIG. 10(c).

Figure 24:
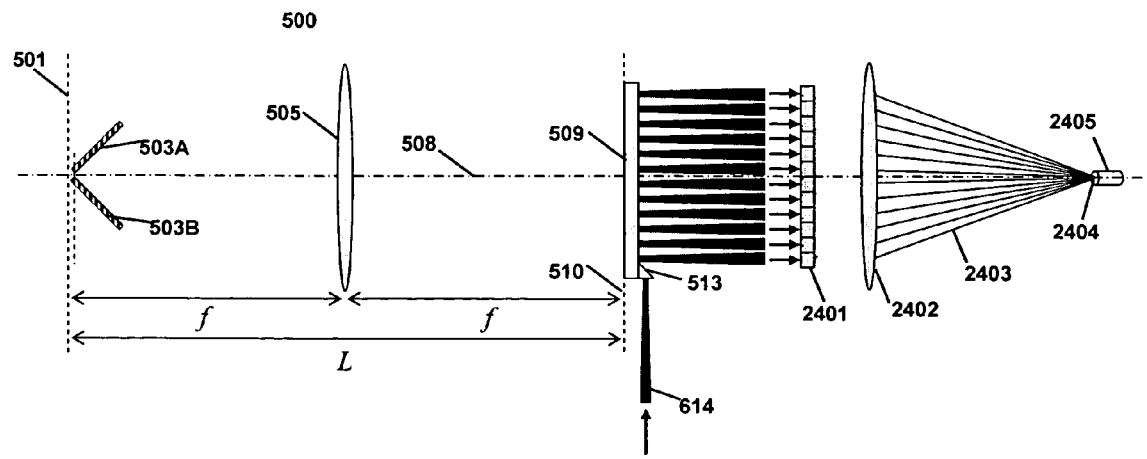
FIG. 24 illustrates an example of the present invention in a general purpose architecture for optical signal processing applications.

Another area of application is in general optical signal processing and filtering operations, where the fact that the present invention provides a constant time delay optical tapped delay line can be exploited. FIG. 24 illustrates an example of the present invention configured for such processing or filtering operations. In the arrangement shown, the plurality of N output beamlets, i.e., the N time delayed samples of the input signal, are applied to a spatial light modulator 2401 (SLM). The pixels of the SLM may then apply individual weightings to the beamlets. These weightings may modify the amplitudes and/or the phases of the beamlets, and the weightings may be programmable via a controller device (not shown). The control signals themselves could be electrical or optical and may be fed to the SLM pixels by any means. The individually weighted beamlets are then integrated or summed by a lens (2402) and focused to spot 2404 on a detector or other output device 2405. The resultant optical intensity produced at the detector represents the output of the filtering or processing function. Processing functions that could be realized include, but are not limited to, finite impulse response (FIR) filtering, correlation, dispersion compensation, multi-path interference compensation, and optical code division multiple access (OCDMA) encoding and decoding. The particular function implemented depends on the temporal signal modulation imposed on the input beam, and the amplitude and/or phase weights applied to the beamlets by the SLM.

Figure 25:
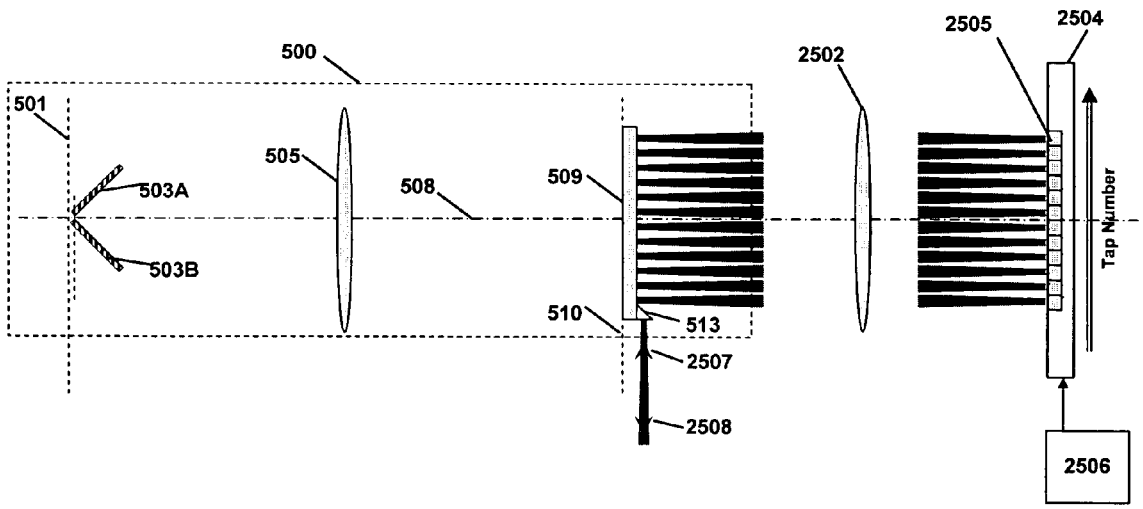
FIG. 25 illustrates another embodiment of a dynamic FIR filter.

FIG. 25 illustrates another embodiment of a dynamic FIR filter. In this embodiment, the OTDL processes the input optical signal 2507 as described in the explanation of FIGS. 5 through 8. The beamlets exiting the OTDL 500 of the present invention are imaged via image optics 2502 onto a planar reflective phase or amplitude modulator array 2505, which are typically part of a modulator assembly 2504. Passage through the OTDL and imaging optics has split the information-carrying optical signal into a number of individually addressable time-delayed replicas (taps) of the input signal. The signals reflected off of the modulator array 2505 are directed back toward the imaging optics 2502 and to the OTDL of the present invention. The reverse operation of the OTDL then produces an output signal 2508. As is know in the art of FIR filters, various filter functionality can be realized by adjusting the (preferably) amplitude of the reflection from individual pixels of the modulator array. The taps will have an optical intensity distribution across the modulator array as determined by the gradient coating of the CFS. The OTDL can be designed to output at least hundreds of taps, nominally, but not necessarily, one tap for each pixel of the phase modulator array. Alternatively, the modulator array could be positioned near the EFS of the output coupler mirror to obviate the need for imaging optics 2502.

The present invention provides for high-resolution optical spectrum analysis. The cavity architecture of the present invention provides a long total path length of the optical beam. That is, a long storage time of the optical signal, or a long total delay time which is equal to the total number of taps N times the roundtrip delay τ. It is this long delay time that enables the high spectral resolution. The spectral resolution in Hertz is approximately equal to the reciprocal of the total delay time, thus the longer the delay time, the finer the resolution. The present invention provides that long delay, which may be, for example, on the order of hundreds of nanoseconds, which equates to a total optical path length on the order of tens of meters of propagation. In addition to providing that long total path length, the problem of beam expansion and divergence that would be encountered with the known hyperfine device is eliminated by the re-imaging operation of the beam that is executed in the present invention such that each time the beam returns to the output coupler mirror it is the same beam size which can be very small. Therefore, this greatly reduces the physical aperture required of the output coupler mirror. For example, in the case of a known hyperfine device made with two plane parallel reflectors and designed for a high spectral resolution application, the output aperture of those reflectors would easily be many centimeters in both the x and y lateral dimensions. Whereas, with the present invention, the aperture of the output coupler mirror can be reduced to something very manageable on the order of one or two centimeters in the x direction, and only a millimeter or less in the y dimension. It is this reduced aperture area which greatly enables the fabrication of the optical components and reduces the overall package size of the device. Furthermore, the re-imaging operation performed by the present invention replicates the input beam N times so N replications of the input Gaussian beam are arrayed across the output coupler mirror. The N output beamlets are all matched in size, they are all parallel, they all have their Gaussian beam waists at a common plane, which is typically coincident with the output coupler mirror, and they occupy a compact aperture area. These geometric features are very advantageous for then passing those output beamlets on to a Fourier optics system, a SLM, or whatever other optical system is used beyond the output coupler mirror to process the output beamlets.

The OTDL of the present invention can also be used for an optical encryptor or privacy device similar to the devices and architectures disclosed in U.S. patent application Ser. No. 10/715,824, filed Nov. 19, 2003, and included herein by reference.

Figure 26:
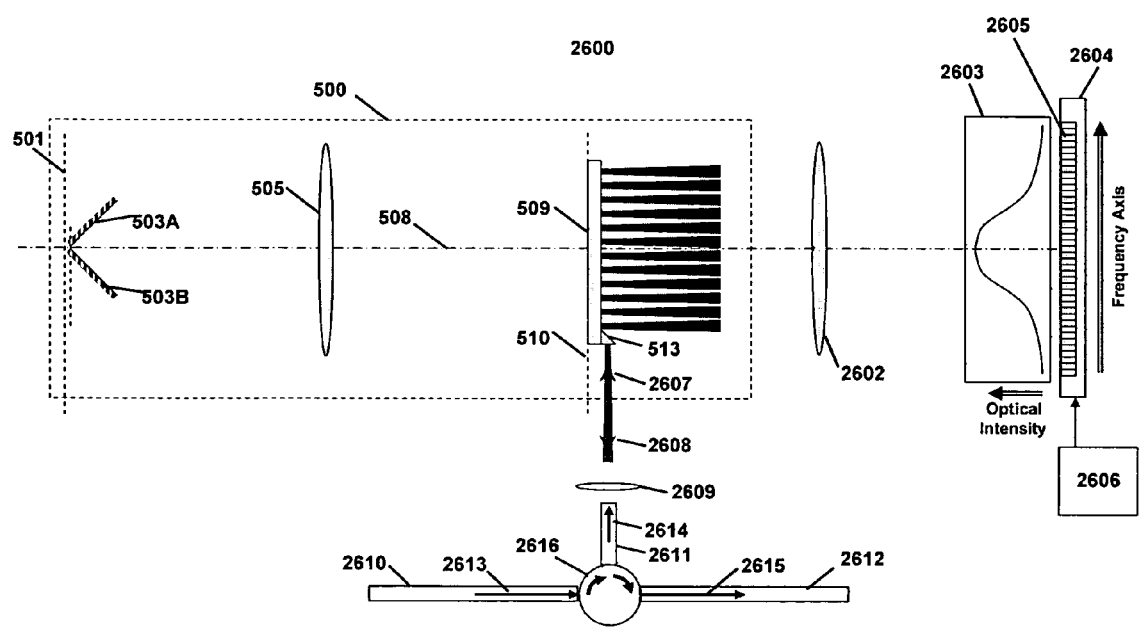
FIG. 26 illustrates an example of the present invention as a reflective-mode high spectral resolution signal encoder for secure transmission on an optical communications link.

FIG. 26 illustrates an example of the present invention as a reflective-mode high spectral resolution signal encoder 2600 for secure transmission on an optical communications link. The operation of the device is as follows. The information-carrying input optical signal 2613 arrives via optical fiber 2610 and is fed to an optical circulator 2616, which feeds directs the signal out of the circulator as signal 2614 in optical fiber 2611. The optical signal from optical fiber 2611 is collimated and focused to an appropriately sized spot at the output coupler mirror of the OTDL of the present invention. The input optical signal is processed as described in the explanations for FIGS. 5 through 8. The beamlets exit the OTDL and a lens system 2602 focuses the beamlets onto a planar reflective phase modulator array 2605, which are typically part of a modulator assembly 2604. Passage through the OTDL and Fourier transform optics has split the information-carrying optical signal into a number of sub-bands. The sub-bands will have an optical intensity distribution across the phase modulator array and shown by the inset graph 2603 of optical intensity versus position along the frequency axis. The OTDL can be designed to output at least hundreds of sub-bands, nominally, but not necessarily, one sub-band for each pixel of the phase modulator array.

The reflective phase modulator array 2605 may be implemented in a number of ways, including, but not limited to, a liquid crystal array, a MEMS device, or an array of III-V or II-VI semiconductor devices. The speed at which the phase shifting changes may directly affect the level of security afforded. In this example one modulator element is associated with each sub-band. As each sub-band passes through a modulator element, it is phase shifted in a manner determined by the control computer 2606. The mirror part of the modulator array 2605 reflects the sub-bands back through lens system 2602. The OTDL 500 recombines the sub-bands into an optical signal 2608, which is coupled beck into input fiber 2611 and directed as optical signal 2615 in fiber 2612 by circulator 2616. The output optical signal 2615 is a scrambled, encoded, or encrypted form of the input optical signal 2613 and is now transmitted through an optical communications link.

The signal from encoder 2600 is received by a substantially identical, but separate decoder 2600, where embodiment 2600 is referred to as an encoder if the output optical signal has wavelength-dependent phase modulation imparted to it and is referred to as a decoder if the output signal has wavelength-dependent phase modulation removed from it. AS in the case on the encoder, sub-bands are imaged onto the reflective phase modulator array 2605, with each array element receiving the same sub-band as the corresponding modulator in the encoder. The control computer 2606 causes each sub-band to be phase shifted in the opposite manner as instructed by control computer of the encoder. Each sub-band is then reflected back through lens system 2602 to OTDL 500. OTDL 500 recombines the sub-bands into a single signal that is output to fiber 2612 for further processing or routing.

The effect of imparting a phase shift to each sub-band is to introduce distortion. If the amount of distortion is sufficient, the information content becomes undecipherable and security is enhanced. The control computer 2606 instructs the modulator array how to modify the phase of the sub-bands in a manner that is unpredictable to anyone not having knowledge of the computer input. The rate at which the phase shifts are changed depends upon the level of security required. A fixed phase shift pattern will sufficiently distort the signal to make it incomprehensible; however, determined interceptors can analyze the signal and eventually determine, and reverse the effects of, the phase shift pattern. To ensure continued security, the fixed phase shift pattern can be changed occasionally, requiring the potential interceptor to start the analysis over again. For the highest security, this change must be made often enough to guarantee that even with the highest performance computational systems anticipated, the phase shifts do not remain static long enough for any known analysis to succeed before the pattern changes.

Preferably, the computer input to the phase modulators may be derived from a deterministic algorithm, the starting point of which may be derived from a key setting provided to the computer. This permits a receiver having knowledge of both the algorithm and the key setting to reproduce the same control computer signal, and thereby, reverse the phase distortions and recover the information signal intact.

For purposes of illustrating the principles of this embodiment of the invention, only a single signal or channel has been described. However, using the multi-port interleaving capability of the OTDL, as described in U.S. Pat. No. 6,608,721, embodiments in accordance with the present invention are capable of simultaneously encrypting all channels of a multi-channel WDM communications system. As used herein the term encrypting includes but is not limited to encoding methods.

It is noted that the OTDL of the present invention could replace the OTDL of all other architectures of U.S. patent application Ser. No. 10/715,824.

The present invention is a constant time delay optical tapped delay line. It provides a fixed and constant time delay from tap to tap. The time delay is independent of the input optical wavelengths or input optical frequencies. As a result, the frequency plane scale that is created by the Fourier transform lens at the focal plane is much more linear than what is produced by the known hyperfine device. The present invention also enables and thereby includes related applications: optical multiplexer/demultiplexer, optical flat-top filter, optical spectrum analyzer, optical finite impulse response filter, optical correlation, optical code division multiplexing, and optical encryption, to name a few.

Reduction to Practice

Figure 17A:
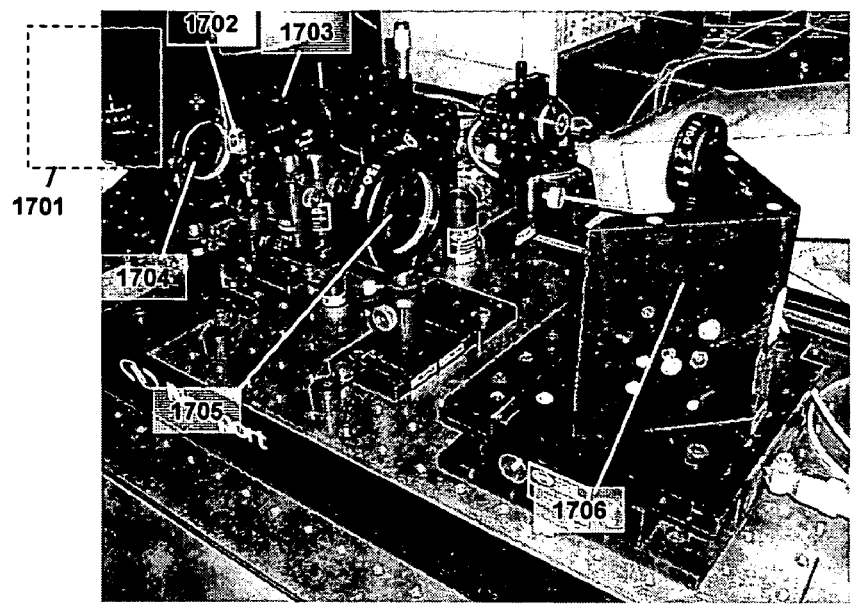
FIG. 17a illustrates the reduction to practice using commercially available parts and standard optical engineering assembly techniques.
Figure 17B:
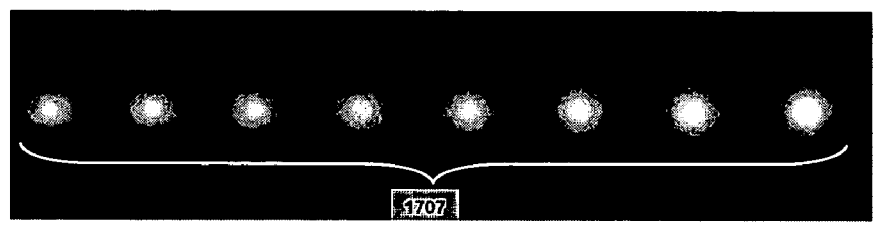
FIG. 17b illustrates an example of actual experimental data obtained with an OTDL spectrum analyzer in accordance with the present invention; eight output beamlets are imaged using a camera at the output of the OTDL.
Figure 17C:
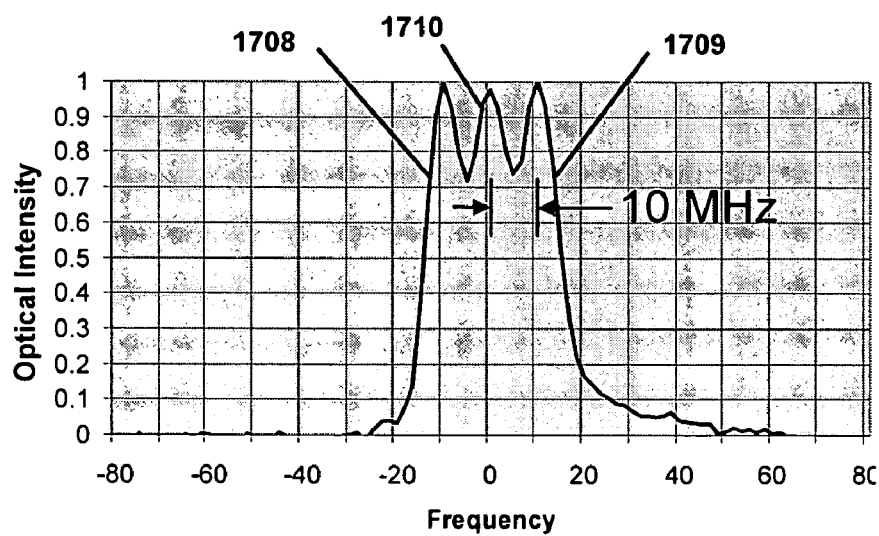
FIG. 17c illustrates an example of actual experimental data obtained with an OTDL spectrum analyzer in accordance with the present invention; a camera at the focal plane measures the optical intensity as a function of position.

FIG. 17 illustrates and experimental arrangement (FIG. 17a) and data obtained from this arrangement (FIGS. 17b and 17c). In this arrangement light enters the apparatus from a collimated fiber output assembly (obstructed from view) just to the right of the collimating lens (1703). Collimating lens 1703 images the output of the fiber onto the output coupler mirror (1704) via the input coupler prism (1702). The light beam then makes several roundtrips within the OTDL cavity formed between the output coupler mirror (1704), the imaging lens (1705), and the dihedral reflector (1706). Each roundtrip produces an output beamlet from the output coupler mirror 1704 headed toward the camera assembly (1701), not shown in the photograph. The imaging camera assembly typically includes imaging optics to image the beamlets spots from the output coupler mirror to the camera sensor array. FIG. 17b illustrates an image of the output beamlets from the output coupler mirror and is experimentally equivalent to viewing the output Gaussian beamlets (701) in FIG. 7. It is important to note the substantially equal size of all the beamlets. In a slightly expanded experimental arrangement to demonstrate spectral analysis, a Fourier transform lens system maps the output beamlets of the output coupler mirror to a frequency plane. A line camera is placed at the focal plane to record the optical intensity along the frequency axis. As a test of the high resolution of this embodiment, the input optical signal is intensity modulated with a 10 MHz sinusoidal signal, which is known to produce modulation sidebands at 10 MHz above and below the optical carrier frequency. FIG. 17c shows the detected optical intensity along the frequency axis and clearly resolves the optical carrier and two sideband peaks; hence, this arrangement is capable of 10 MHz resolution, better than any commercially available direct detection optical spectrum analyzer.

Mathematical Theory with Design Examples of Benefits

Some of the mathematical theory of operation of the present invention is given in the following. The free spectral range (FSR) of the OTDL cavity is given by $$FSR = c/2L,$$

where c is the speed of light in the medium of the cavity and L is the cavity length. The FSR is the unambiguous bandwidth of the device, and is equivalent to the cavity mode spacing in units of Hertzian frequency.

The spectral resolution $\rho$ is roughly equal to the FSR divided by the number of taps N $$\rho \cong FSR/N = 1/N\tau$$

where $\tau$ is the total delay time of the device, 2L/c.

The focal length of the imaging lens is given by $$f = L/2.$$

The tap spacing $\Delta$ of the output beamlets should be preferably greater than or equal to $\pi$ times $w_o$, where $w_o$ is the radius of the input Gaussian beam waist, for the case where the input beam is Gaussian.

$$\Delta \geq \pi w_o$$

Having a Gaussian input beam is not required, but that typically is the case. Satisfying this inequality condition ensures that the spectral envelope roll-off at the frequency plane, that is, the weighting function at the frequency plane, is not too severe. If this inequality condition is satisfied, then the spectral envelope roll-off over the central interference order will be limited to no more than 2.2 dB from the center of the bandwidth to the edge of the bandwidth.

The radius of the Gaussian beam that is incident on the dihedral mirrors (for the case where the input beam is Gaussian) is given by $$w_d = (\lambda f)/(\pi w_o)$$

Referring to FIG. 8, the FIG. shows an example of the path of just the chief ray. The chief ray is the center ray of the beam. Physically, the beam has some non-zero width about the chief ray, and $w_d$ represents the radius of the beam when it is incident on the dihedral mirrors at the left end of the OTDL cavity.

The angular adjustment of the dihedral mirror pair, $\delta\theta$, is the amount that the dihedral angle differs from 90 degrees, and is given by $$\delta\theta = \Delta/2f$$

The angular adjustment is used to control the tap spacing $\Delta$. In addition, the vertex of the dihedral mirror pair is offset from the back focal plane (BFP) of the imaging lens by a small distance $\delta z$.

The offset h of the foci $F_1$ and $F_2$ from the optical axis should be preferably greater than or equal to 2 times $w_d$.

$$h \geq 2w_d$$

Satisfying this inequality condition ensures that the beams that are incident on the dihedral mirrors are not incident on the vertex region of the mirrors. That is, it is preferable that the entire beam profile be completely incident on one mirror or the other, and not divided between the two.

The angle $\alpha$ is given by $$\alpha = h/f$$

Typically, one chooses $\alpha$ to produce a value of the offset h that satisfies the inequality condition above of h being greater than or equal to $2w_d$.

The angular dispersion is given by (in units of radians per hertz)

$$\text{angular dispersion} = 2L\lambda/c\Delta$$

The angular dispersion describes the angular change of the output beam from the OTDL cavity as the input optical frequency is changed. Here the term "output beam" refers to the composite totality of the N output beamlets or N taps. That is, as the input optical frequency of the input beam is changed, the relative phases of the output beamlets change to effectively steer the output beam of the present invention. The effective propagation direction of the output beam is perpendicular to a line of constant phase connecting the N output beamlets. The amount of angular change in radians per frequency change in Hertz is the angular dispersion. It is the angular change as a function of frequency that gets converted by the Fourier lens to a spatial change in the position of the focused spot at the focal plane.

The aperture size required at the output coupler mirror of the OTDL cavity in the x axis is equal to the number of taps times the tap spacing $\Delta$.

$$\text{aperture} = \text{number of taps} \times \Delta$$

It is this aperture that can be made relatively small in the present invention as compared to the known hyperfine device, for the same specifications. Typically, the reduction in aperture that one can achieve with the present invention versus a known hyperfine device is on the order of 10× to 100×. A key feature of the present invention is this reduction in aperture required at the output coupler mirror.

The f-number of the imaging lens is given by $$f/\# = f/(\text{aperture} + 2h)$$

The f-number has several uses or meanings to an optical designer. In this case, it enables one to describe the level of difficulty of designing and fabricating the imaging lens. An f-number of five or greater is relatively easy, while an f-number approaching one or lower is very challenging.

The following are two design examples which illustrate two possible application points for the present invention and the types of geometric parameters that might be required of the OTDL cavity. Example #1 is for a FSR of 5 GHz. The OTDL cavity length of the present invention is relatively short, 30 millimeters, and thus the overall package can be quite compact. The corresponding aperture is 14 millimeters in the v axis (refer to FIG. 19), versus tens of centimeters in the v axis for a known hyperfine device for the same specifications; and an aperture at least tens of millimeters in the perpendicular axis as well. The FSR of 5 GHz for the OTDL leads to a potentially difficult lens design because the corresponding f-number is roughly equal to 1. The optical parameters for use of the OTDL of the present invention in design example #1 are listed below.

FSR=5 GHz
Number of taps=200
Spectral resolution=25 MHz
L=c/2FSR=30 mm
f=15 mm
$w_o$=20 μm (arbitrarily chosen to keep aperture small)
$\Delta$=70 μm
$w_d$=370 μm
$\delta\theta$=0.134°
h=800 μm
$\alpha$=3.06°
angular dispersion=4429 μrad/GHz
aperture=200 taps×$\Delta$=14 mm
f/#=0.96

Now consider design example #2, which is for a FSR that is ten times lower, or 500 MHz. The cavity length is then ten times longer, 300 millimeters. The aperture is still compact, 25 millimeters, even though less aggressive tap spacing was assumed, 500 μm. The f-number is now much larger (4.8) which represents a much more feasible lens to design and fabricate. Regarding the spectral resolution in these two examples: for example #1 the resolution is 25 MHz and for example #2 the resolution is 10 MHz, which, in terms of optical spectrum analysis, is quite fine resolution. This is on the order of 10× finer resolution than can be obtained with the known hyperfine device, and is also much finer than resolutions that are currently achieved by conventional grating-based optical spectrum analyzer devices. Commercially available grating-based optical spectrum analyzers can achieve resolutions typically on the order of several Gigahertz at best. Therefore, a resolution of 10 MHz, for example, is a factor of at least 100× finer resolution than what can be obtained with commercial instruments. The optical parameters for design example #2 are listed below.

FSR=500 MHz
Number of taps=50
Spectral resolution=10 MHz
L=c/2FSR=300 mm
f=150 mm
$w_o$=100 μm
$\Delta$=500 μm
$w_d$=740 μm
$\delta\theta$=0.095°
h=3 mm α=1.15°
angular dispersion=6200 μrad/GHz
aperture=50 taps×Δ=25 mm
f/#=4.8

More on the mathematical theory of operation can be found by reference to U.S. Pat. No. 6,608,721, and in particular column 8, line 10 through column 11, line 10 including the two equations in column 11. The bulk of this theory developed for the known hyperfine device is directly applicable to the present invention as well. However, there appears to be at least two differences in the theory of operation between the known hyperfine device and the present invention. Referring to U.S. Pat. No. 6,608,721 column 8, line 22, item (1), it is assumed for the known hyperfine device that the diameter of the input beam is sufficiently large such that the beam profiles of the output beamlets 124*a-i* are approximately the same. In other words, it is assumed that the diameter of the input beam is sufficiently large that the beam divergence is sufficiently small that the beam stays relatively collimated. This assumption may not always hold true, especially for high resolution designs where N τ is large. In contrast, the present invention avoids this beam divergence issue by creating beam profiles of the output beamlets that are identically the same, not approximately the same. Therefore, if one starts out with a very small input beam, say 100 microns diameter, it will stay 100 microns diameter every time it is re-imaged through the OTDL cavity of the present invention.

A second distinguishing feature in the mathematical theory between the known hyperfine device and the present invention has to do with the time delay τ between adjacent output beamlets, that is, the round trip time delay of the cavity. This parameter is defined in U.S. Pat. No. 6,608,721 column 8, line 58 where it says "let τ be the time delay between adjacent output beams." For the known hyperfine device, the parameter τ is actually a function of the input wavelength or frequency of the input beam because the incidence angle for constructive interference is a function of wavelength and the relative time delay between adjacent output beams is a function of incidence angle. Essentially, the time delay of a particular beamlet depends on the angle of interest within the beamlet. This is not the case for the present invention. Due to the geometric design of the OTDL of the present invention, all output beamlets have the same time delay independent of angle. As the angle for constructive interference of the output beamlets changes with wavelength or frequency, the time delay τ does not. Therefore, we refer to the present invention as being a "constant time delay" optical tapped delay line. Consequently, the frequency plane scale for the present invention that is produced by the Fourier transform lens is much more linear than for the known hyperfine device. The operation of the known hyperfine device is governed by the multiple beam interference equation, which also governs the operation of a Fabry-Perot interferometer, as described in U.S. Pat. No. 6,608,721, in column 1. At the bottom of column 1 is the multiple beam interference equation, $$2d \cos \theta = m\lambda.$$

The angle θ is the propagation angle of the output beam emerging from the known hyperfine device. If one solves the equation for θ, one sees that θ goes as an inverse cosine function of the wavelength λ times a constant. The inverse cosine function is very nonlinear in the regime in which the hyperfine device is typically operated, i.e., at small angles θ. Therefore, with the known hyperfine device, one has a nonlinear frequency scale at the focal plane which, depending on the application, may be awkward to deal with. However, since the present invention is a constant time delay optical tapped delay line, and the tap to tap time delay τ does not vary with wavelength, the output beam angle θ can be shown to be proportional to an inverse sine function of the wavelength λ times some constant. Therefore, the frequency plane scale is much more linear for the present invention.

Processing of Multiple Beams or Multiple Inputs

Processing of multiple input beam signals simultaneously is possible with the present invention, in a similar manner to the known hyperfine device. FIG. 6 in U.S. Pat. No. 6,608,721 illustrates a known hyperfine device processing a series of six separate input beams simultaneously that are distributed in the horizontal axis perpendicular to the frequency axis. The same type of operation can be done with the present invention, although it may require additional optical components to what is shown in FIGS. 5, 6, 7 and 8. Additionally, spectral analysis operation of the OTDL of the present invention is reversible so that by reversing the direction of light, a plurality of input signals from the right in FIG. 6 will yield a single output signal. The reversibility and ability to process multiple beams allows for numerous additional uses for the OTDL of the present invention. These include, but are not limited to: flat-top filter, flat-top multiplexer-demultiplexer, optical add-drop multiplexer, optical code division multiple access encoder/decoder, optical encryption, arbitrary waveform generator, and dual-stage or multiple-beam optical spectrum analyzer. In the following, three examples of these added functionalities are presented. Other uses are easily discerned from these examples.

Figure 20A:
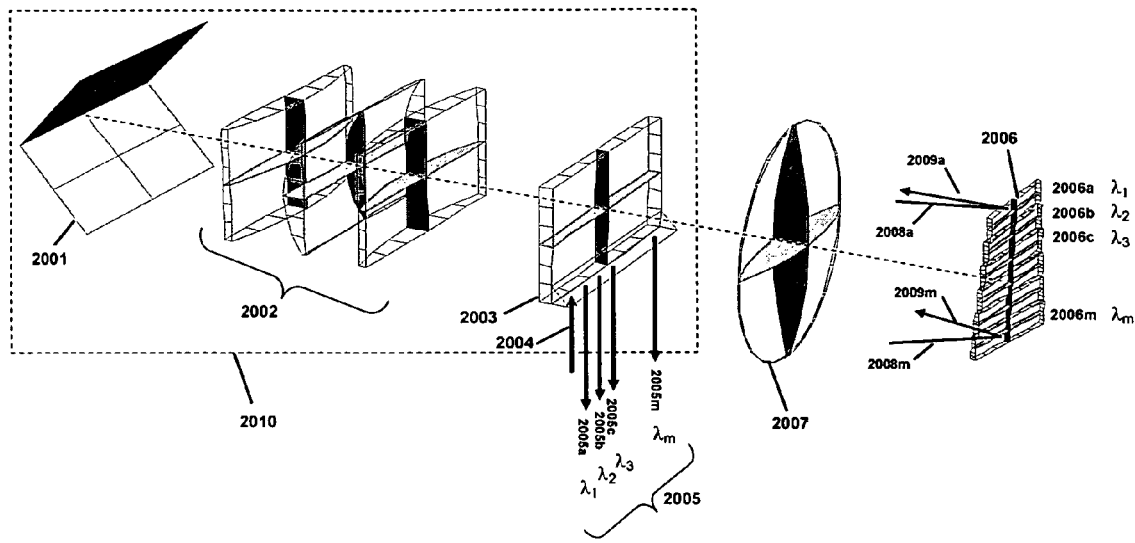
FIG. 20 illustrates an example of the present invention as a reflective-mode channelizer. In this embodiment the reflective mode produces a flat-top sharp-skirt filter response for each of the output channels. Three views of the same arrangement are shown for clarity: a) a 3-D view, b) top view, and c) side view.
Figure 20B:
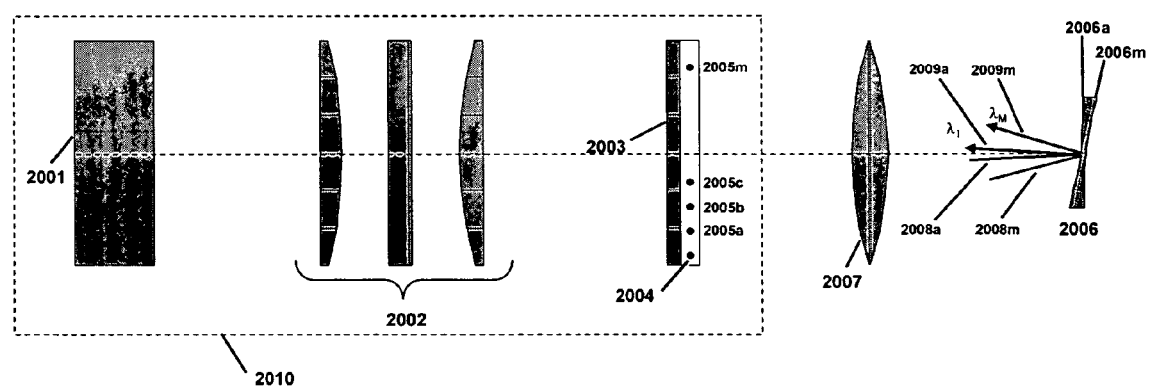
Figure 20C:
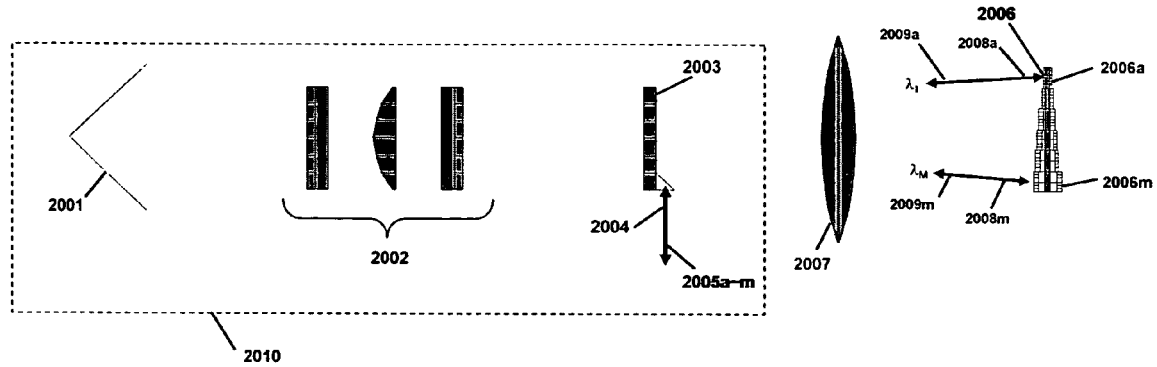

FIG. 20 illustrates an example of an embodiment of the invention configured as a de-multiplexer or wavelength router. An OTDL 685 has a single input 686 and multiple outputs 687*a-f*. A plurality of mirror segments 690*a-f* are positioned at the focal plane of lens system 691 and rotated relative to each other such that each mirror segment receives a selected one of the resolved wavelength channels and reflects it to a selected one of the outputs 687*a-f*. Hence, the multi-faceted mirror array at the focal plane reflects the output channels to different horizontal positions orthogonal to the frequency axis enabling discrete output beams. The resulting router provides fixed channel routing (i.e., simple de-multiplexing) if the mirror segments are immovable. By constructing the mirror segments to be movable relative to each other, however, or by substituting MEMS devices for the mirror segments, the router may be dynamically programmed to send channels to selected outputs.

Figure 21A:
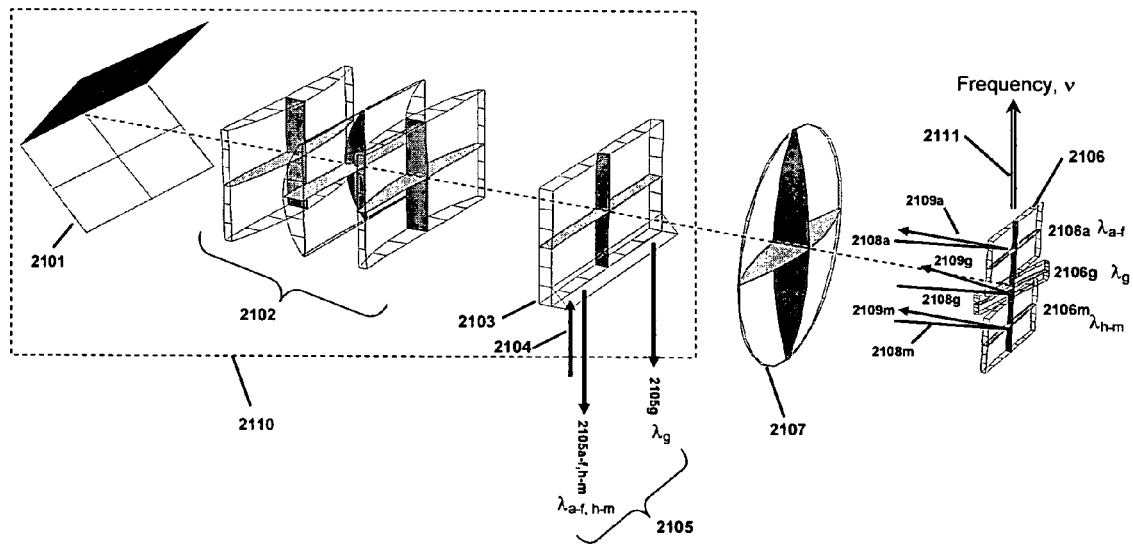
FIG. 21 illustrates an example of the present invention as a reflective-mode band-pass filter. In this embodiment a multi-part mirror assembly at the focal plane selects parts of the spectrum for filtering. Three views of the same arrangement are shown for clarity: a) a 3-D view, b) top view, and c) side view.
Figure 21B:
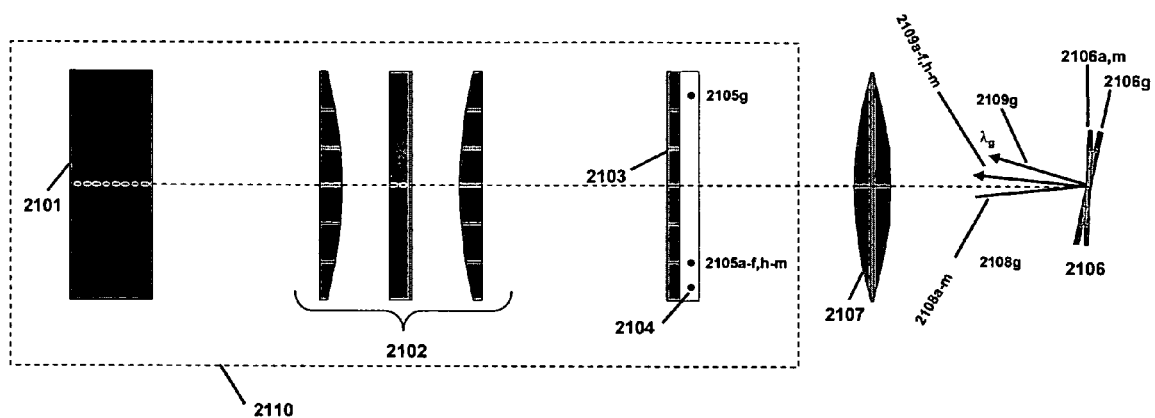
Figure 21C:
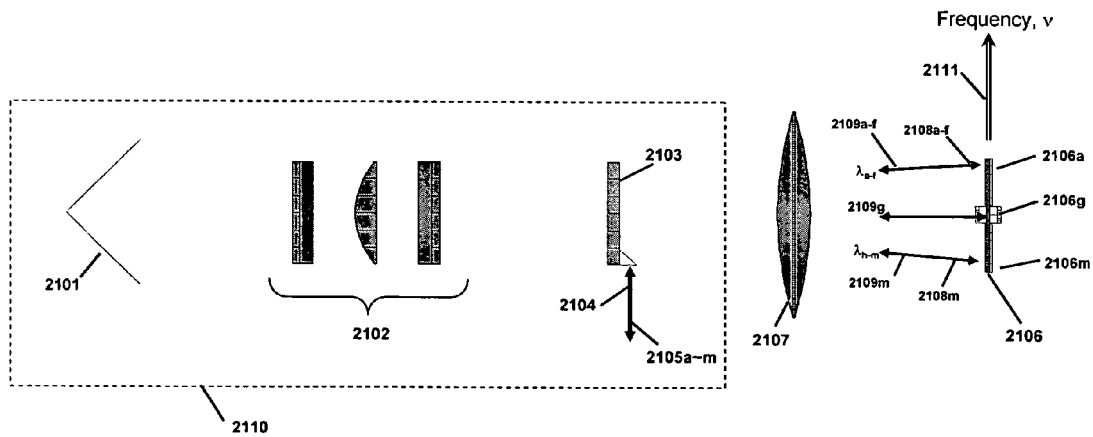

FIG. 21 illustrates an example of the present invention configured as a reflective-mode flat-top filter. FIG. 21*a*, 21*b*, 21*c* are different views of the same embodiment. In this embodiment a multi-part mirror assembly at the focal plane selects parts of the spectrum for filtering. An input light beam 2104 is separated into time-delayed beamlets (not shown) by OTDL 2110, as described above in reference to FIG. 19. The beamlets are focused by Fourier transform lens system 2107 (possibly anamorphic) and 2108*a-m* represent example rays incident on the focal plane 2106. The beamlets interfere at focal plane 2106 and are spread vertically across the focal plane according to the wavelengths included in the input beam. A mirror 2106*g* directs the specific resolved wavelengths incident on the focal plane at that point back through OTDL 2110 to an output 2105*g*. The vertical extent of mirror 2106*g* defines the range of resolvable wavelengths (i.e., the filtered channel) that is reflected back to output 2105*g*. By moving mirror 2106*g* vertically up or down the focal plane and by changing the vertical extent of mirror 2106*g*, any set range of resolvable wavelengths (center wavelength and channel bandwidth) can be selected and directed to output 2105g. Because OTDL 2110 is two-dimensional, it is not necessary that output 2105g be collocated with input 2104. Instead, by rotating mirror 2106g slightly, as illustrated in FIG. 21, output 2105g can be offset from input 2104 by a predetermined amount. Similarly, mirrors 2106a and 2106m, which reflect wavelengths $\lambda_{a\text{-}f}$ and $\lambda_{h\text{-}m}$, respectively, can be preferably offset in angle so as to direct those wavelengths to output 2105a. In this way, a preferred set a wavelengths (i.e., filtered channel) within the input beam is selected (or filtered) to output 2105g. Additionally, since the mirror 2106g can be of width greater than the minimum spot size at the focal plane, the filter response in substantially "flat" or constant for a majority of wavelengths selected. The advantages of a flat filter response are known and are also discussed in application Ser. No. 10/199,495.

Possible variations to the embodiment of FIG. 21 are as follows. The mirrors at the focal plane can be a set of movable mirrors to allow dynamic definition of the filtered wavelengths. The mirror(s) could be set to reflect the filtered wavelength(s) $\lambda_g$ or the unfiltered wavelengths $\lambda_{a\text{-}f}$ and $\lambda_{h\text{-}m}$ to the input location of input 2104. The wavelengths ranges of $\lambda_{a\text{-}f}$, $\lambda_{h\text{-}m}$ and $\lambda_g$ are completely arbitrary in that any wavelength or wavelength range can range from no wavelengths to a large number of wavelengths.

Figure 22A:
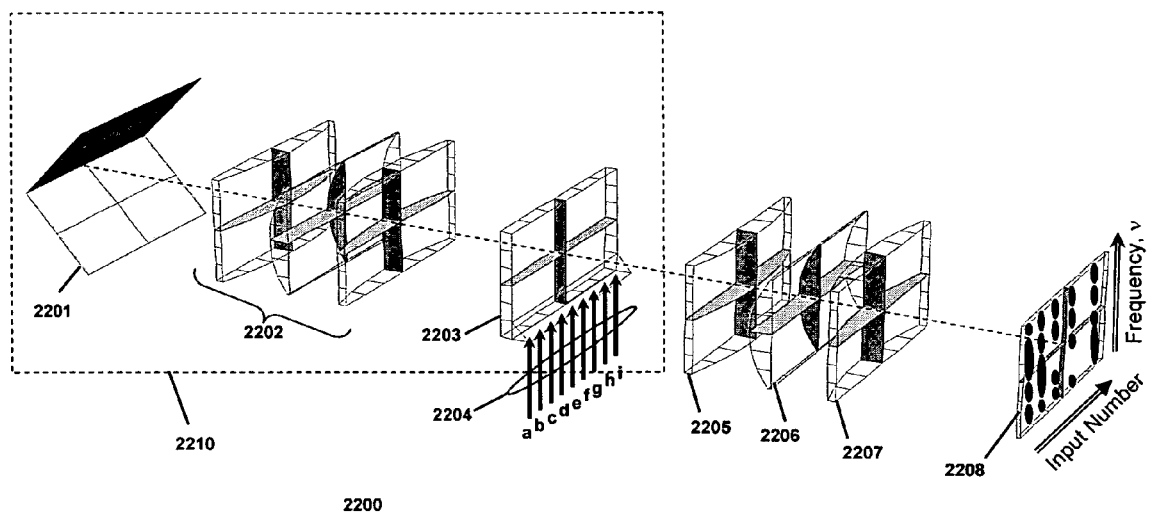
FIG. 22 illustrates an example of the present invention as a multiple input spectrum analyzer. In this embodiment a detector array or a fiber array may be placed at the focal plane. Three views of the same arrangement are shown for clarity: a) a 3-D view, b) top view, and c) side view.
Figure 22B:
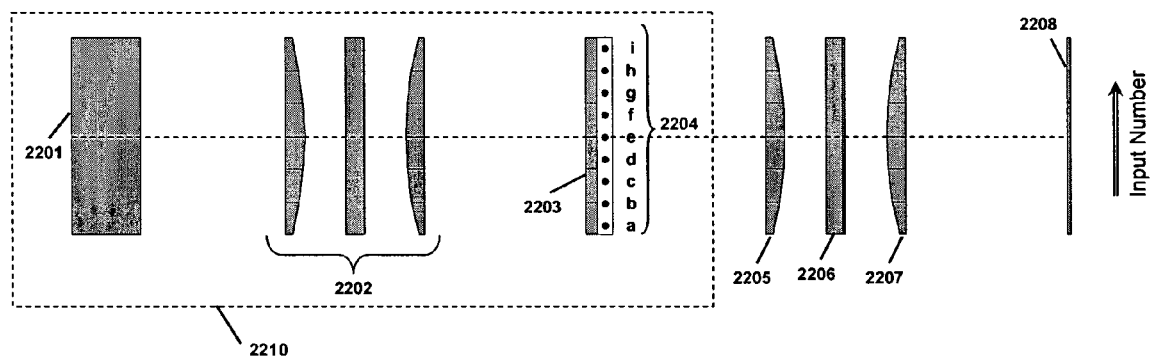
Figure 22C:
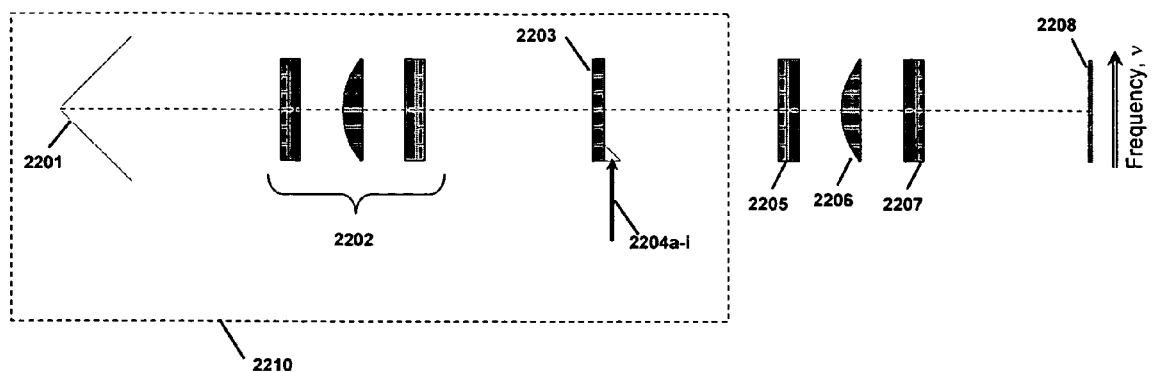
Figure 23:
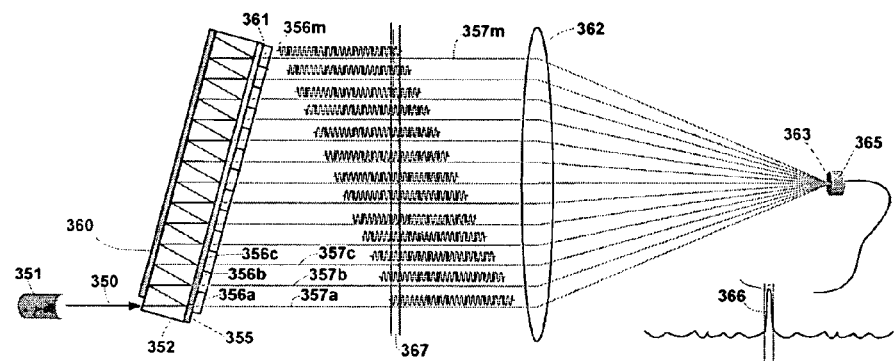
FIG. 23 illustrates an example of the present invention where the output mirror and the spatial light modulator are integrated in a monolithic structure.

FIG. 22 illustrates an example of the present invention configured as a multiple input beam optical spectrum analyzer. To process multiple input signals, here labeled as input beams a through i, the imaging lens inside the OTDL cavity may preferably be a system of cylinder lenses rather than a single lens. Alternatively, as opposed to cylinder lenses, another possible way of configuring the OTDL cavity is to modify the way the dihedral mirrors are arranged on the left side of the cell. Such a configuration would require two pairs of dihedral mirrors, arranged orthogonally, so that one pair with an angle of 90+δθ degrees provides the beam walk effect in the vertical axis, while the other pair with an angle of 90 degrees provides an exact retroreflection in the horizontal axis. Referring again to FIG. 22, the Fourier lens system generally would consist of a set of cylinder lenses in order to Fourier transform the beamlets in the frequency axis, and image the beamlets in the horizontal axis to the frequency plane so that i distinct spectra are produced for the i distinct inputs.

Figure 12:
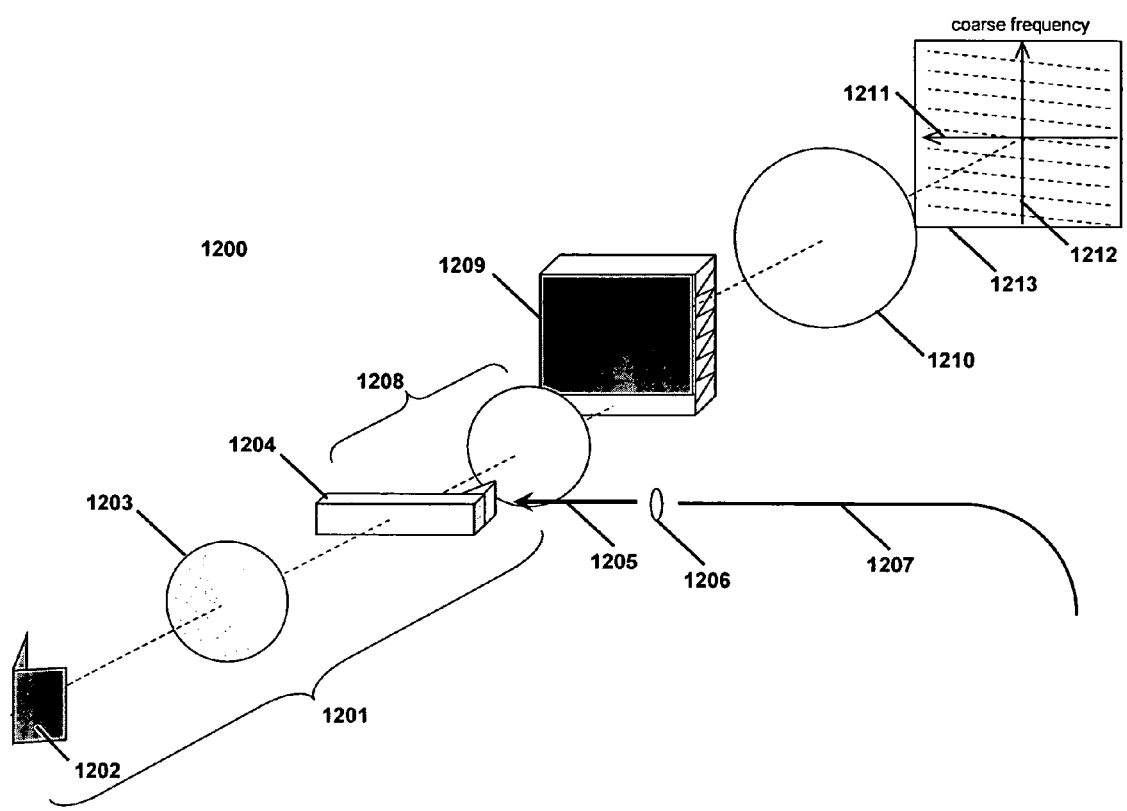
FIG. 12 illustrates an example of a design for a very large time-bandwidth product two-dimensional (2-D) folded spectrum analyzer.
Figure 13:
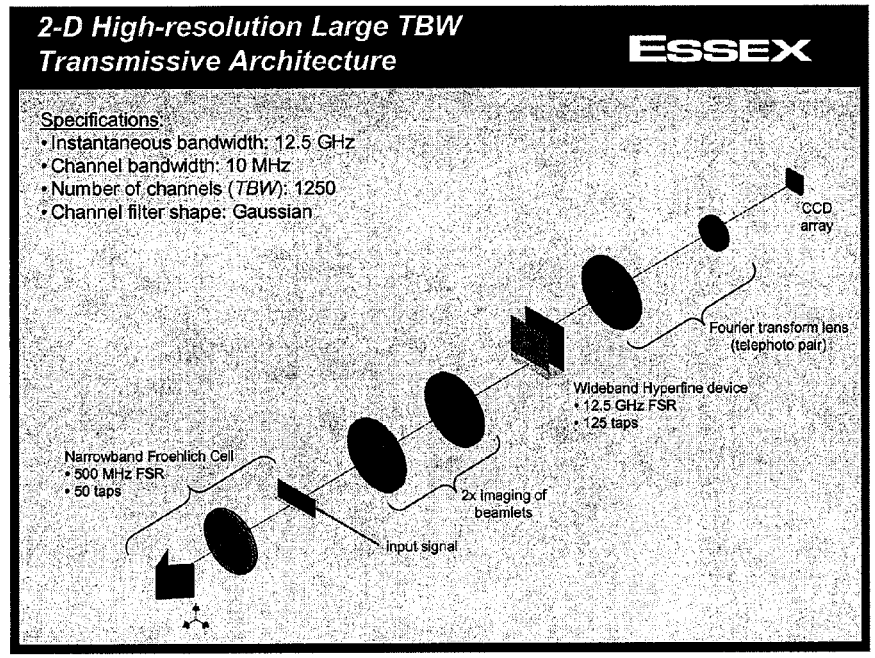
FIG. 13 illustrates a second example of a design for a large time-bandwidth product two-dimensional (2-D) folded spectrum analyzer or channelizer. The subassembly labeled "Narrowband Froehlich Cell" represents the OTDL in accordance with the present invention.
Figure 14:
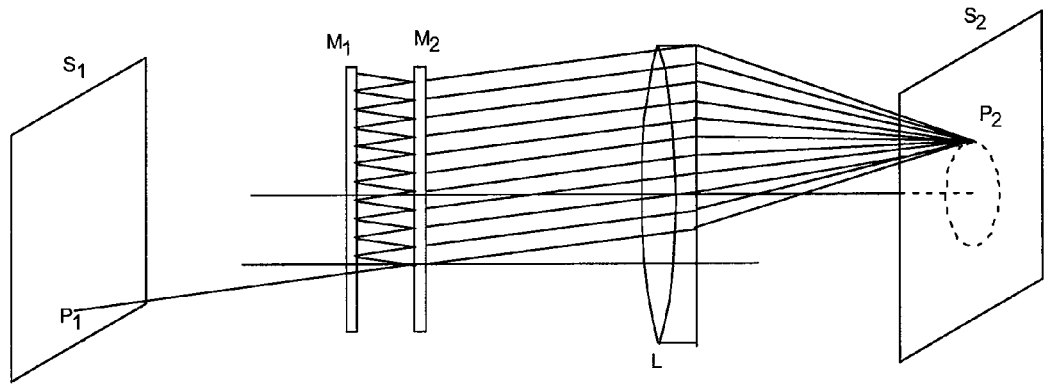
FIG. 14 illustrates an example of a prior art Fabry-Perot interferometer.
Figure 15:
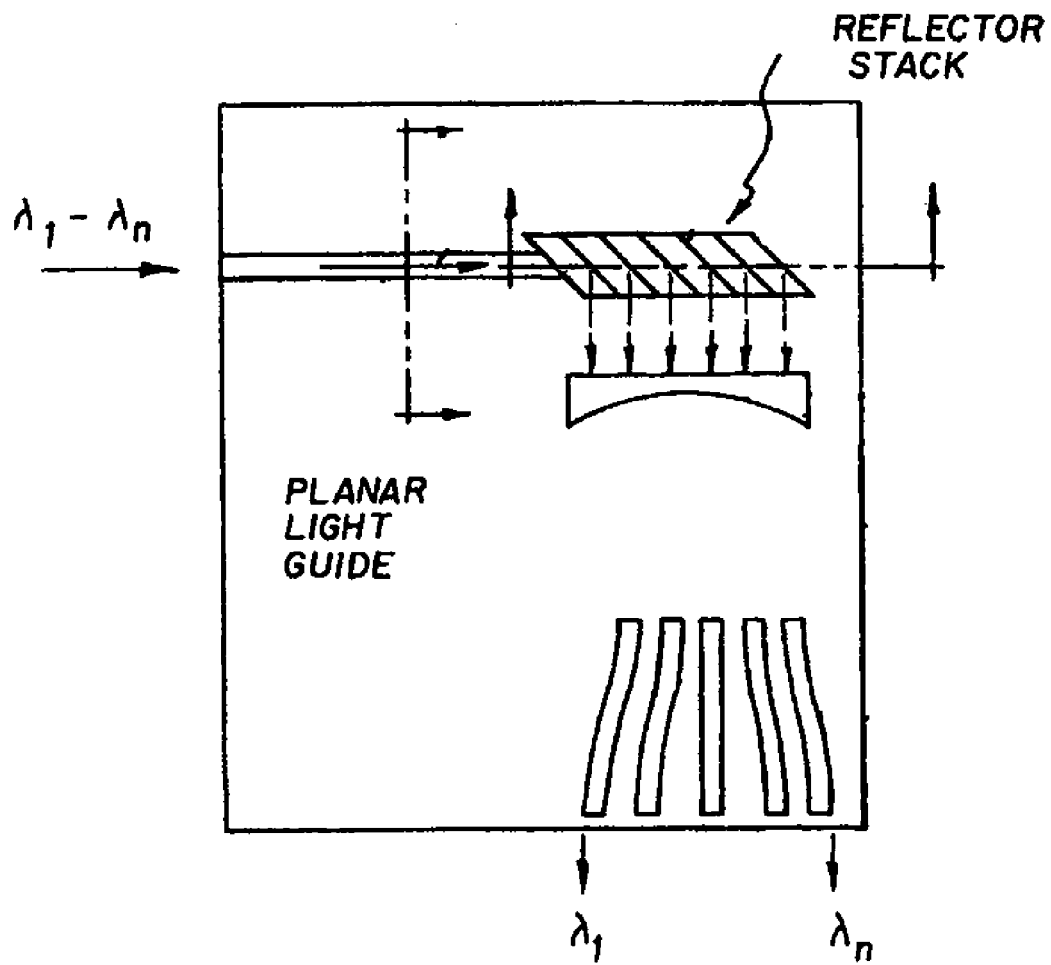
FIG. 15 illustrates an example of a prior art planar waveguide integrated optical multiplexer and demultiplexer device.
Figure 16:
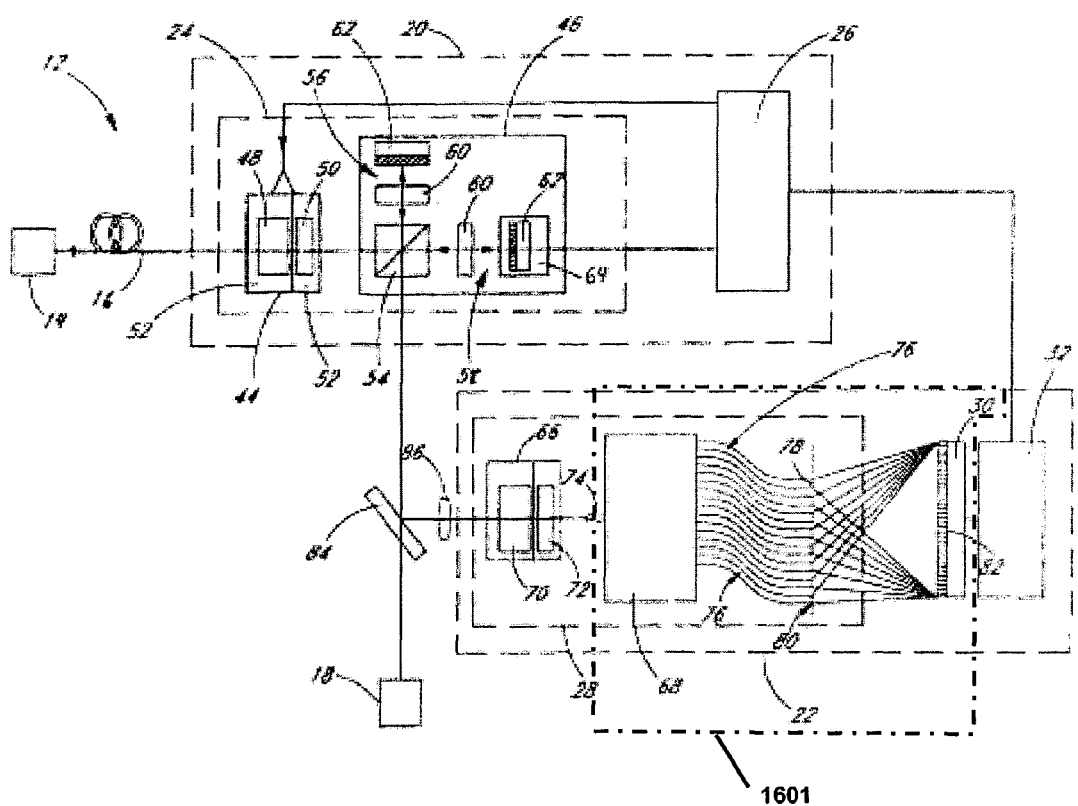
FIG. 16 illustrates an example of a prior art optical fiber-based optical tapped delay line spectrum analyzer.

FIG. 12 illustrates an example of a design for a very large time-bandwidth product two-dimensional (2-D) folded spectrum analyzer. The subassembly 1201 represents an OTDL in accordance with the present invention. The subassembly 1209 represents an OTDL in accordance with the known hyperfine device, where the two-dimensionality of known OTDL-based OSP applications is utilized by rotating the known hyperfine device 1209 about the z axis by ninety degrees relative to the first OTDL device 1201. In such a "crossed" embodiment the first OTDL device performs a fine, high-resolution channelization. The second OTDL device performs a coarse, low-resolution channelization. The crossed embodiment may be used, for example, in a communication system where there is a single fiber carrying hundreds or even several thousand carrier wavelengths or channels, as opposed to tens of fibers carrying fifty to one hundred channels each. The crossed OTDL devices could channelize all the wavelengths emitted from this single fiber, and the wavelengths would be spatially separated at the output plane. A pair of crossed OTDL devices can channelize the entire bandwidth of a fiber to high resolution (i.e., one GHz or less).

Two example design specification sets are given here for illustrative purposes. First, subassembly 1201 can be designed for 50 MHz FSR and 100 kHz resolution. In this case, the roundtrip delay time, τ, is 1/FSR or 20 nanoseconds. Given the speed of light, c, is approximately 300,000,000 meters/second, the round trip distance L from the output coupler mirror 1204 to the dihedral reflector 1202 is ~3 meters. The focal length, f, of the imaging lens system 1203 (consisting of a singlet lens or combination of lenses to yield a possibly anamorphic system) is L/2 or ~1.5 meters. The number of taps, N, required for a given resolution ρ is roughly equal to the FSR/ρ; in this case 50 MHz/100 kHz yields 500 taps. If we chose to introduce the input beam into the system 1200 with an imaging optics that yields a input beam diameter, $w_o$, of 100 micrometers (microns), then the beamlet spacing, Δ, at the output coupler mirror is $\Delta \geq \pi w_o$ or greater than about 314 microns. If we let Δ be 350 microns, then the aperture width of the output coupler mirror, NΔ, is 157 mm. In this design, imaging optics 1208 provides 1-to-1 imaging of these beamlets onto a known hyperfine device 1209 configured for multiple parallel input beams. The output beamlets from 1201 are considered input beams to the known hyperfine device 1209. The known hyperfine device is designed to have a resolution approximately equal to the FSR of the OTDL of 1201, or 50 MHz. The target FSR of the combined folded spectrum analyzer system 1200 (and thus of the known hyperfine device) is chosen to be 10 GHz. Hence, the number of taps, N, is 10 GHz/50 MHz or 200 taps, and the mirror separation of 1209 is c/(2 FSR) or approximately 15 mm. The Fourier transform lens system 1210 has an effective focal length of 1500 mm. This combined arrangement would yield an unambiguous spectral analysis bandwidth of 10 GHz, a resolution of 100 kHz, a time-bandwidth product (FSR/ρ) of 10 GHz/100 kHz or 100,000 and a time aperture, 1/ρ, of 10 microseconds. These combined performance parameters can not be practically met with any other known optical system.

The input light is traced through system 1200 as follows. The input beam is introduced via an optical fiber 1207. Imaging optics 1206 images the input free-space light beam 1205 through the input coupler prism to a 100 micron spot at the gradient reflectivity side (cavity side) of the output coupler mirror 1204. The OTDL cavity, as described with respect to FIGS. 5 through 8, produces a plurality of M output beamlets from output coupler mirror 1204, which are directed toward imaging optics 1208. The plurality of M beamlets from 1201 is imaged as M input beams onto the input of the known hyperfine device 1209. For each input beam, the known hyperfine device produces N beamlets for a total of M×N beamlets, which are directed toward Fourier transform optics (possibly anamorphic) 1210. The set of M×N beamlets can be viewed as a plurality of quasi-continuous wavefronts (each with associated propagation directions), where there is one wavefront for each wavelength within the main input beam 1205. The Fourier transform optics then transforms the wavefronts (with specific propagation directions) to spots on the focal plane 1213. The spots on the focal plane have specific positions related to the associated wavefront directions and, therefore, to wavelength.

There will exist in the focal plane a coarse (1212) and fine (1211) frequency direction. As the OTDL of 1201 has greater time delay between output beams, there is a greater resolution, or frequency dependence, associated with the horizontal direction in the focal plane. Consider an input beam 1205 that contains a single wavelength. That beam would produce a single one-dimensional wavefront at the output of 1204 and a single two-dimensional wavefront at the output of 1209. Hence, a nominal single spot would be produced at the focal plane. Suppose that the input wavelength is decreased (frequency increased), then the spot would move mostly horizontally across the focal plane and slightly vertically. When the spot reached the left edge of the focal plane, the neighboring "order" spot would appear on the right edge. As the wavelength of input light is continued to be decreased, the spots formed on the focal plane would trace out a lines at a slight angle to horizontal (as shown as dotted lines in FIG. 12).

This 2-D folded spectrum analysis system can be used in numerous ways. Two examples are that of placing either an array of optical fibers or an array of detectors at the focal plane. In the case of optical fibers, light from the main input beam 1205 with wavelengths corresponding to the position of each fiber would be collected and transmitted by the fiber. In the case of detectors, a detector signal is generated when light from the main input beam 1205 contains optical energy at the wavelength corresponding the position of the detector.

In a second example of system 1200, subassembly 1201 can be designed for 500 MHz FSR, 10 MHz resolution and 50 taps. The input beam diameter is set to 100 microns again. In this case, there would be 2× imaging optics for imaging these beamlets onto a known hyperfine device. The known hyperfine device would be designed to have approximately 12 mm mirror spacing, yielding a 12.5 GHz FSR, 100 MHz resolution, and 125 taps. This would yield and analysis bandwidth of 12.5 GHz, channel bandwidth of 10 MHz, a number of channels, which equals the time-bandwidth product, of 1250.

The present invention is useful for high spectral resolution, optical spectrum analysis of optical signals. Specific examples would include a fiber optic telecommunications system where one would, for analysis purposes, look at the optical spectrum of a single wavelength channel of a wavelength division multiplexed system. Even though it is called a single wavelength channel, once information is encoded on the carrier wavelength it is no longer a pure single wavelength. It is actually a spectrum of wavelengths about the carrier that correspond to the encoded signal information. It is often desirable to spectrum analyze the spectral content of such a signal. This is not possible with currently available commercial optical spectrum analyzers because they do not have sufficient resolution. The resolution of known optical spectrum analyzers is on the order of several Gigahertz to about 10 GHz, which does not allow one to finely resolve the components of a fiber optic communications signal. The present invention allows the fine spectral analysis of such a signal.

Signal information may be imparted on the input optical beam in a variety of ways. Typically, there may be a separate device, referred to as a modulator, as is used in fiber optic communications systems. The modulator receives an electrical signal, e.g., a data signal, and imparts the signal onto the optical carrier or modulates the optical carrier with the electrical data information. Typically a modulator is used to impart information on a single wavelength beam, typically a laser beam, such that the optical beam consists of not one wavelength but a spectrum of wavelengths. As with electrical signals, there is a need to analyze the spectrum of information-modulated optical carriers or wavelength channels. A related application is in spectrum analysis of radio frequency or RF signals, such as radar signals or communications signals. This might typically be a military application, where there is a need to spectrum analyze a wide range of radar and communications signals that are in the radio frequency domain. Those electrical signals can be imparted on an optical beam, with a modulator, and then that optical beam could be input to a cell in accordance with the present invention. Together with other optics and detector arrays (e.g., FIG. 22), the OTDL of the present invention could be used to perform spectrum analysis on these radio frequency signals as they appear on an optical carrier. As compared to conventional electronic techniques, a much wider RF bandwidth with finer resolution can be analyzed.

Variations

FIG. 18 illustrates examples of three possible embodiments for a prism input coupler for introducing the input beam into the OTDL cell. In the first example (1814), the input prism is contacted to the exit, anti-reflection coated surface (1816) of the output coupler mirror (1810). The contacting could be pure optical contacting or assisted by an optical adhesive, not shown. The input beam is introduced into the cavity (to the left of 1810, not shown) by directing the beam through prism input surface 1813, which is preferably anti-reflection coated for wavelengths of interest. The beam then reflects of the hypotenuse of the prism (1815) due to total internal reflection or a reflected coating applied to the hypotenuse. The beam then travels through the mirror substrate and through a preferably antireflection coated aperture (1812), where the beam enters the cavity.

In the second example (1824), the input prism is held separately (not shown) but close to the cavity exit, anti-reflection coated surface (1826) of the output coupler mirror (1810). The input beam is introduced into the cavity (to the left of 1820, not shown) by directing the beam through prism input surface 1823, which is preferably anti-reflection coated for wavelengths of interest. The beam then reflects of the hypotenuse of the prism (1825) due to total internal reflection or a reflected coating applied to the hypotenuse. The beam then travels through the mirror substrate and through a preferably antireflection coated aperture (1822), where the beam enters the cavity.

In the third example (1834), the input prism is contacted to the side of the output coupler substrate. The input beam is introduced into the cavity (to the left of 1830, not shown) by directing the beam to the hypotenuse surface of the input prism 1832, which is preferably coated for high reflectance of wavelengths of interest. The beam then enters the cavity directly.

It should be noted that input coupler prism in all examples need not be a symmetric prism having angles of 45 degrees as suggested by FIG. 18. The prism angles could be judicially selected for ease of input of a beam from any angle. Indeed, the hypotenuse of the input coupler prism (1832) of the third example could be selected for only a slight angle to the gradient coating surface 1831; this would allow a beam substantially perpendicular 1831 to be reflected into the cavity.

Another variation on input coupler could not include a prism at all. An example of an approach without using a prism would be an optical fiber with an attached or separate means of focusing the light positioned to the right of the output coupling mirror. The input beam from the fiber is directed into the cavity via an aperture near the position of aperture 1812 of the first example. The designer must take care to avoid obstructing the beamlet exiting the output coupler mirror with the fiber input assembly.

Figure 27:
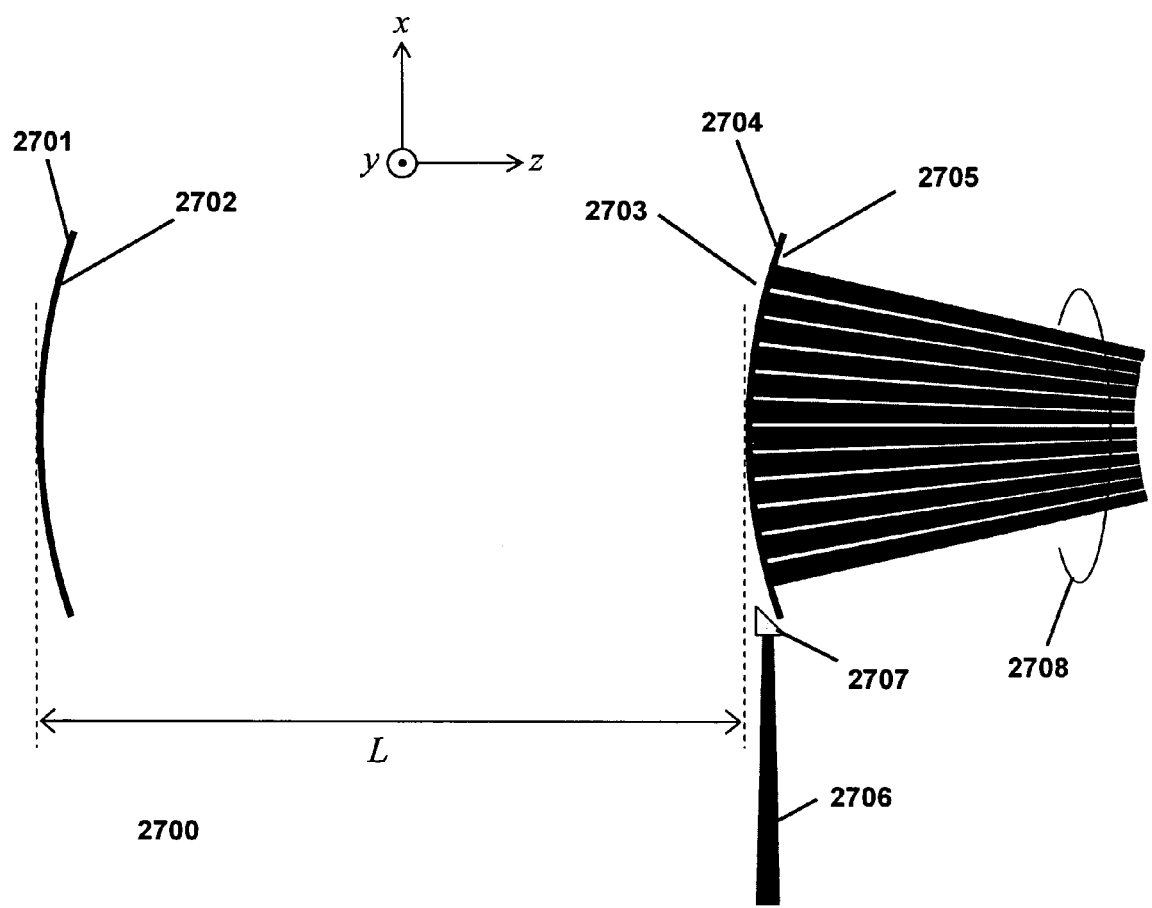
FIG. 27 illustrates an example of an alternative embodiment of the present invention. In the embodiment shown, an optical tapped delay line (OTDL) is constructed with two spherical mirrors forming the cavity. This has the advantage of eliminating the imaging lens at the center of the cavity as depicted in FIGS. 5, 6, 7 and 8. An input Gaussian beam may be introduced into the cavity by means of a coupling prism, and the beam is then replicated on each round trip of the cavity to form a set of N output Gaussian beamlets, in a manner similar to that illustrated in FIG. 7.

FIG. 27 illustrates an example of an alternative embodiment of the present invention. In the embodiment shown, an optical tapped delay line (OTDL) is constructed with two spherical mirrors forming the cavity. This has the advantage of eliminating the imaging lens at the center of the cavity as depicted in FIGS. 5, 6, 7 and 8. An input Gaussian beam may be introduced into the cavity by means of a coupling prism, and the beam is then replicated on each round trip of the cavity to form a set of N output Gaussian beamlets, in a manner similar to that illustrated in FIG. 7.

The invention claimed is:
1. A device comprising:
an optical cell having a cavity and an output plane and configured to direct a collimated input beam on a beam path comprising multiple round trips through the cavity, the collimated input beam having a diameter, the beam path establishing at the output plane multiple output taps that are spatially distributed and temporally separated,
a beam divergence controller located within the cavity that controls beam divergence in the cell by re-imaging the beam on each round trip through the cavity, and
a near-retroreflector, configured such that a given incident ray path associated with the near-retroreflector is not parallel to a corresponding outgoing ray path associated with the near-retroreflector, forming an end of the cavity opposite the output plane,
wherein each of the multiple output taps has a diameter substantially not greater than the diameter of the input beam.
2. The device of claim 1 wherein the beam divergence controller comprises a lens through which the beam travels at least one time.
3. The device of claim 2 wherein the near-retroreflector comprises a dihedral minor pair and an angle between mirrors of the dihedral mirror pair is 90 degrees plus or minus $\delta\theta$ wherein

$$\delta\theta = \Delta/2f$$

where
$\Delta$ is a spacing of the taps; and
$f$ is a focal length of the lens.
4. The device of claim 3 wherein $$\Delta \geq \pi\omega_o$$

where $\pi_o$ is a radius of an input Gaussian beam waist.
5. The device of claim 1 wherein the beam divergence controller comprises a lens through which the beam travels multiple times.
6. The device of claim 1 wherein the beam divergence controller is configured to control beam divergence so that each of the output taps has substantially the same diameter.
7. The device of claim 1 wherein the beam divergence controller is configured to control beam divergence so that each of the output taps has a diameter substantially equal to the diameter of the input beam.
8. The device of claim 1 wherein the beam divergence controller is configured to control beam divergence so that the multiple output taps are mutually parallel.
9. The device of claim 1 wherein the beam divergence controller is configured to control beam divergence so that each of the multiple output taps has substantially the same waist size and each of the waists are in a common plane.
10. The device of claim 1 wherein the beam path is not less than one centimeter.
11. The device of claim 1 wherein the beam path is not less than one meter.
12. The device of claim 1 wherein the beam path is not less than twenty meters.
13. The device of claim 1 wherein the beam divergence controller is configured to control beam divergence so that the device has a free spectral range lower than about 10 GHz.
14. The device of claim 1 wherein the beam divergence controller is configured to control beam divergence so that the device has a free spectral range between about 5 GHz and about 10 GHz.
15. The device of claim 1 wherein the beam divergence controller is configured to control beam divergence so that the device has a spectral resolution .rho. of about 100 kHz, a time-bandwidth product (FSR/$\rho$) of about 100,000 and a time aperture (1/$\rho$) of about 10 microseconds, where FSR represents free spectral range.
16. The device of claim 1 wherein the beam divergence controller is configured to control beam divergence so that each of the output taps has a diameter not greater than 1.1 times the diameter of the input beam.
17. The device of claim 1 wherein the beam divergence controller is configured to control beam divergence so that each of the output taps has a diameter not greater than 1.5 times the diameter of the input beam.
18. The device of claim 1 wherein the near-retroreflector comprises a dihedral minor pair.
19. The device of claim 18 wherein an angle between mirrors of the dihedral minor pair is 90 degrees plus or minus $\delta\theta$ where $\delta\theta$ is a nonzero deviation angle.
20. A method comprising:
providing an optical cell having a cavity, an output plane, and a near-retroreflector forming an end of the cavity opposite the output plane, the near-retroreflector comprising a dihedral minor pair having an oblique angle between first and second minors of the mirror pair that differs from ninety degrees by a small deviation angle, $\delta\Gamma$;
directing a collimated input beam on a beam path comprising multiple round trips through the cavity, the collimated input beam having a diameter, the beam path establishing at the output plane multiple output taps that are spatially distributed and temporally separated; and
controlling beam divergence in the cell by re-imaging the beam on each round trip through the cavity, such that each of the multiple output taps has a diameter substantially not greater than the diameter of the input beam.
21. The method of claim 20 wherein the step of controlling beam divergence comprises providing a lens through which the beam travels at least one time.
22. The method of claim 21 wherein $$\delta\theta\Delta/2f$$

where
$\Delta$ is a spacing of the taps; and
$f$ is a focal length of the lens.
23. The method of claim 22 wherein $$\Delta \geq \pi\omega_o$$

where $\omega_o$ is a radius of an input Gaussian beam waist.
24. The method of claim 20 wherein the step of controlling beam divergence comprises providing a lens through which the beam travels multiple times.
25. The method of claim 20 wherein the step of controlling beam divergence comprises controlling beam divergence so that each of the output taps has substantially the same diameter.
26. The method of claim 20 wherein the step of controlling beam divergence comprises controlling beam divergence so that each of the output taps has a diameter substantially equal to the diameter of the input beam.
27. The method of claim 20 wherein the step of controlling beam divergence comprises controlling beam divergence so that the multiple output taps are mutually parallel.
28. The method of claim 20 wherein the step of controlling beam divergence comprises controlling beam divergence so that each of the multiple output taps has substantially the same waist size and each of the waists are in a common plane.
29. The method of claim 20 wherein the beam path is not less than one centimeter.

30. The method of claim 20 wherein the beam path is not less than one meter.

31. The method of claim 20 wherein the beam path is not less than twenty meters.

32. The method of claim 20 wherein the step of controlling beam divergence comprises controlling beam divergence so that the cell has a free spectral range lower than about 10 GHz.

33. The method of claim 20 wherein the step of controlling beam divergence comprises controlling beam divergence so that the cell has a free spectral range between about 5 GHz and about 10 GHz.

34. The method of claim 20 wherein the step of controlling beam divergence comprises controlling beam divergence so that the cell has a spectral resolution .rho. of about 100 kHz, a time-bandwidth product (FSR/$\rho$) of about 100,000 and a time aperture (1/$\rho$) of about 10 microseconds, where FSR represents free spectral range.

35. The method of claim 20 wherein the step of controlling beam divergence comprises controlling beam divergence so that each of the output taps has a diameter not greater than 1.1 times the diameter of the input beam.

36. The method of claim 20 wherein the step of controlling beam divergence comprises controlling beam divergence so that each of the output taps has a diameter not greater than 1.5 times the diameter of the input beam.

37. A device comprising:
   a planar coupler minor positioned at a first end of an optical cell, the planar coupler having a first surface and a second surface;
   a dihedral mirror pair, comprising first and second mirrors, positioned at a second end of the optical cell, the two mirrors being positioned with edges at a common vertex to form a first, reflex angle and a second, oblique angle, with the second angle being smaller than the first angle, the first and second mirrors being oriented such that the surfaces of the mirrors forming the second angle faces the first surface of the planar coupler minor across the optical cell; and
   a lens located within a cavity of the optical cell between the planar coupler minor and the dihedral minor pair and configured to control beam divergence in the optical cell.

38. The device of claim 37, wherein each of the planar coupler mirror and the dihedral minor pair are configured to direct a collimated input beam on a beam path comprising multiple round trips through the cavity, the collimated input beam having a diameter, the beam path establishing at the second surface of the planar coupler minor multiple output taps that are spatially distributed and temporally separated, each of the multiple output taps having a diameter substantially not greater than the diameter of the input beam.

39. The device of claim 37, wherein the lens has an associated focal length, and the lens is positioned such that each of a vertex of the dihedral mirror pair and the first surface of the planar coupler mirror is separated from the lens by a distance substantially equal to the focal length of the lens.

40. The device of claim 37, wherein the beam path is not less than twenty meters.

* * * * *

UNITED STATES PATENT AND TRADEMARK OFFICE
CERTIFICATE OF CORRECTION

PATENT NO. : 7,768,709 B2 Page 1 of 1
APPLICATION NO. : 11/346566
DATED : August 3, 2010
INVENTOR(S) : Fred F. Froehlich & David B. Nichols It is certified that error appears in the above-identified patent and that said Letters Patent is hereby corrected as shown below:

Column 25, line 34, delete "$\pi_o$" and insert --$\omega_0$--

Column 26, line 39, delete "$\delta\theta\Delta/2f$" and insert --$\delta\theta = \Delta/2f$--

Column 26, line 14, delete "minor" and insert --mirror--

Signed and Sealed this

Twenty-first Day of September, 2010

David J. Kappos
*Director of the United States Patent and Trademark Office*